US011522861B2

(12) United States Patent
Touati et al.

(10) Patent No.: US 11,522,861 B2
(45) Date of Patent: *Dec. 6, 2022

(54) METHODS TO AUTHORIZING SECONDARY USER DEVICES FOR NETWORK SERVICES AND RELATED USER DEVICES AND BACK-END SYSTEMS

(71) Applicant: Telefonaktiebolaget LM Ericsson (publ), Stockholm (SE)

(72) Inventors: Samy Touati, Pleasanton, CA (US); Paolo Fiorini, Mountain, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

This patent is subject to a terminal disclaimer.

(21) Appl. No.: 17/023,828

(22) Filed: Sep. 17, 2020

(65) Prior Publication Data

US 2021/0006560 A1 Jan. 7, 2021

Related U.S. Application Data

(63) Continuation of application No. 15/764,595, filed as application No. PCT/SE2016/050846 on Sep. 9, 2016, now Pat. No. 10,798,096.

(Continued)

(51) Int. Cl.
*H04L 29/06* (2006.01)
*H04L 9/40* (2022.01)
(Continued)

(52) U.S. Cl.
CPC .............. *H04L 63/10* (2013.01); *G06F 21/34* (2013.01); *G06F 21/43* (2013.01); *H04L 9/3234* (2013.01);
(Continued)

(58) Field of Classification Search
CPC ... H04L 63/10; H04L 9/3234; H04L 63/0853; G06F 21/34; G06F 21/43; H04W 12/06; H04W 12/068; H04W 12/08
See application file for complete search history.

(56) References Cited

U.S. PATENT DOCUMENTS 8,943,571 B2 1/2015 Paddon
10,380,621 B2* 8/2019 Thrasher ............ G06Q 30/0241
(Continued)

FOREIGN PATENT DOCUMENTS

WO WO 2015/108924 A2 7/2015

OTHER PUBLICATIONS

Suganya et al., "Dynamic group key authentication mechanism for data sharing in network", 2014 IEEE International Conference on Computational Intelligence and Computing Research, Date of Conference: Dec. 18-20, 2014.*

(Continued)

*Primary Examiner* — Morshed Mehedi
(74) *Attorney, Agent, or Firm* — Sage Patent Group

(57) ABSTRACT

Methods are provided to authorize a secondary user device for a network service provided over a network. Responsive to receiving a request from a primary user device, a voucher may be transmitted over the network to the primary user device. A request for an authorization waiver may be received from the secondary user device over the network, wherein the request for the authorization waiver includes the voucher that was transmitted to the primary user device. Responsive to receiving the request from the secondary user device including the voucher, an authorization waiver may be transmitted to the secondary user device. Related methods of operating primary and secondary user devices are also discussed.

33 Claims, 13 Drawing Sheets

Related U.S. Application Data

(60) Provisional application No. 62/240,155, filed on Oct. 12, 2015.

(51) Int. Cl.

| | | |
|---|---|---|
| *H04W 12/08* | (2021.01) | |
| *G06F 21/34* | (2013.01) | |
| *G06F 21/43* | (2013.01) | |
| *H04L 9/32* | (2006.01) | |
| *H04W 12/06* | (2021.01) | |

(52) U.S. Cl.
CPC ......... *H04W 12/06* (2013.01); *H04W 12/068* (2021.01); *H04W 12/08* (2013.01)

(56) References Cited

U.S. PATENT DOCUMENTS

| | | | | |
|---|---|---|---|---|
| 2005/0183142 A1* | 8/2005 | Podanoffsky | ........... | G06F 21/31 713/155 |
| 2006/0185004 A1 | 8/2006 | Song et al. | | |
| 2011/0219427 A1 | 9/2011 | Hito et al. | | |
| 2012/0199647 A1 | 8/2012 | Hwang | | |
| 2012/0210346 A1* | 8/2012 | McCoy | ............. | H04N 21/2387 725/25 |
| 2012/0210413 A1 | 8/2012 | Aku et al. | | |
| 2013/0036476 A1* | 2/2013 | Roever | ................... | G06F 21/10 726/27 |
| 2013/0311768 A1 | 11/2013 | Fosmark | | |
| 2014/0173125 A1 | 6/2014 | Selvanandan | | |
| 2014/0282923 A1 | 9/2014 | Narayan et al. | | |
| 2014/0366080 A1 | 12/2014 | Gupta | | |
| 2015/0102907 A1 | 4/2015 | Hadizad | | |
| 2015/0150106 A1* | 5/2015 | Lund | ..................... | H04L 63/083 726/7 |
| 2015/0161360 A1* | 6/2015 | Paruchuri | .......... | H04N 21/2743 726/27 |
| 2015/0206139 A1 | 7/2015 | Lea | | |
| 2015/0271098 A1* | 9/2015 | Somadder | ............... | H04L 67/42 709/225 |
| 2015/0278805 A1 | 10/2015 | Spencer et al. | | |
| 2015/0281225 A1* | 10/2015 | Schoen | ................... | H04L 63/06 726/9 |
| 2016/0260031 A1* | 9/2016 | Pace | .................. | G06Q 20/1235 |
| 2022/0012325 A1* | 1/2022 | Mumma | ................. | G06F 21/44 |

OTHER PUBLICATIONS

International Search Report and Written Opinion of the International Searching Authority, PCT/SE2016/050846, dated Nov. 18, 2016, 16 pages.

Chong, Ming K., et al., "A Survey of User Interaction for Spontaneous Device Association," ACM Computing Surveys, vol. 47, No. 1, Article 8, Apr. 2014, pp. 1-40.

Hardt, D., "The OAuth 2.0 Authorization Framework," RFC 6749, Internet Engineering Task Force, IEFT; Standard Internet Society (ISOC) 4, Oct. 13, 2012, pp. 1-76.

Zhou, Bo et al., "Cookie-Based CDN Security Authorization Design," Internet Technology and Applications (iTAP), 2011 International Conference, Aug. 16, 2011, pp. 1-3.

Put, et al., "inShopnito: An Advanced yet Privacy-Friedly Mobile Shopping Application," 2014 IEEE World Congress on Services, Date of Conference: Jun. 27-Jul. 2, 2014.

Han, et al., "Mobile Data Offloading Through Opportunistic Communications and Social Participation," IEEE Transactions on Mobile Computing, vol. 11, Issue: 5, May 2012.

* cited by examiner

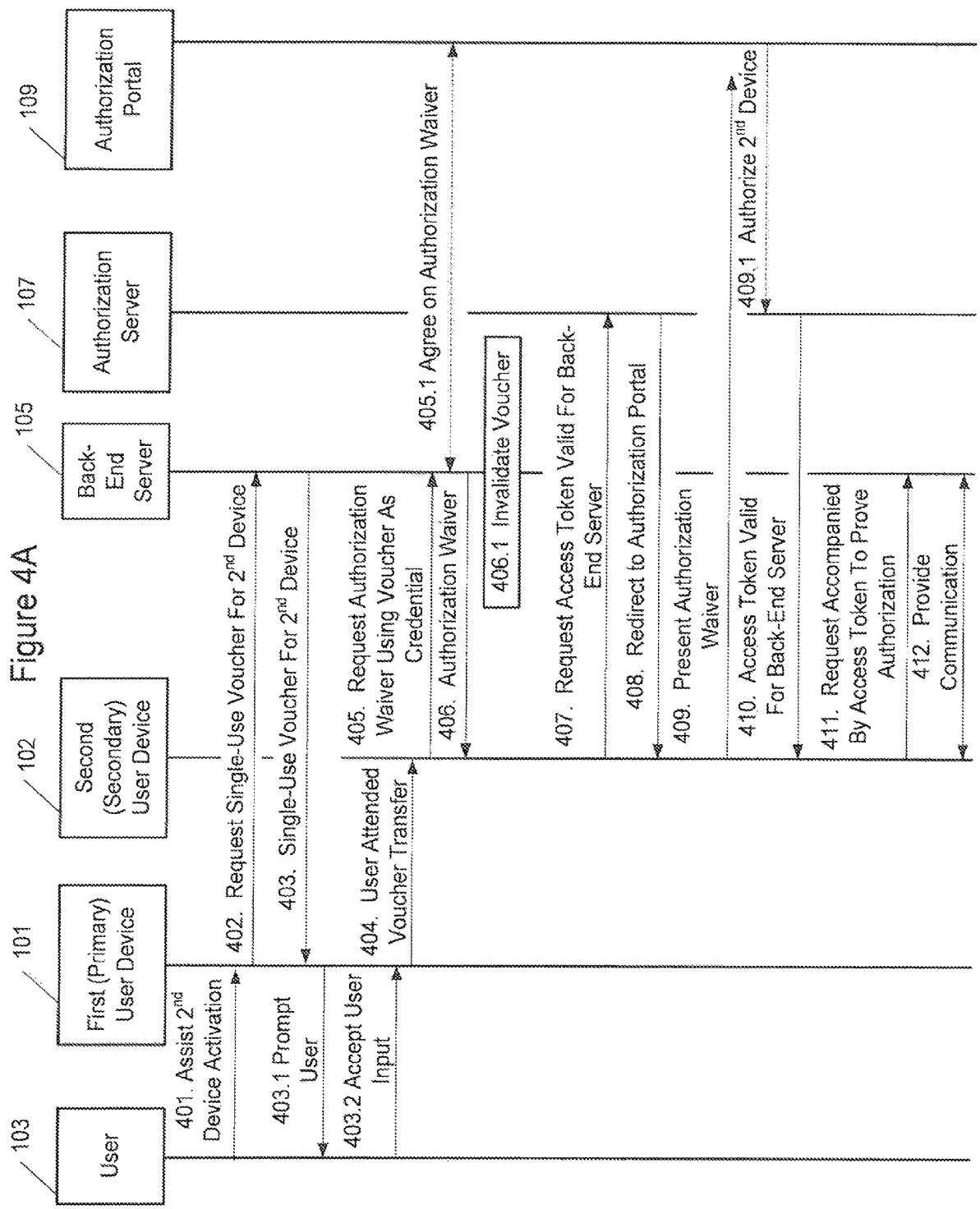

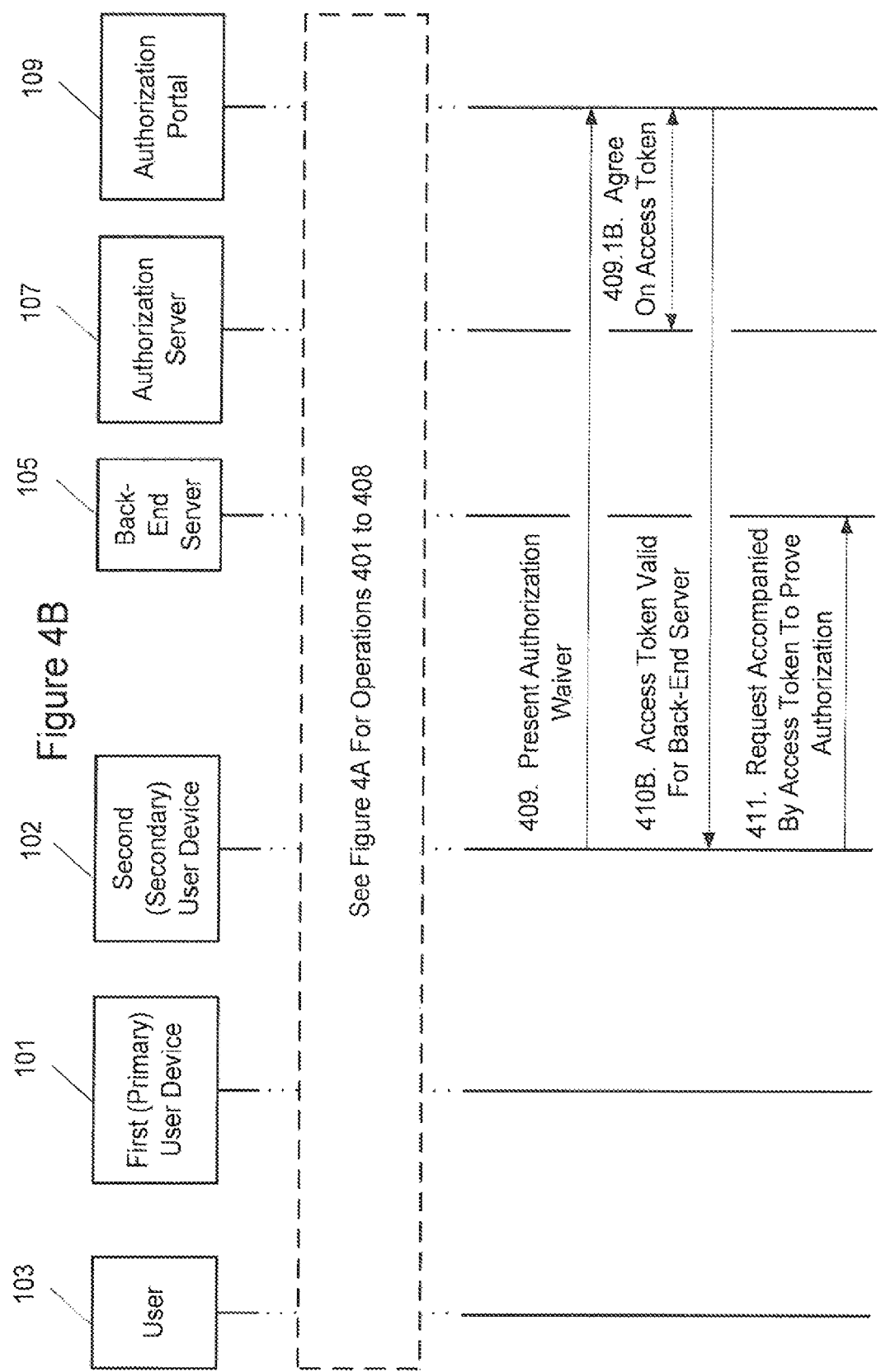

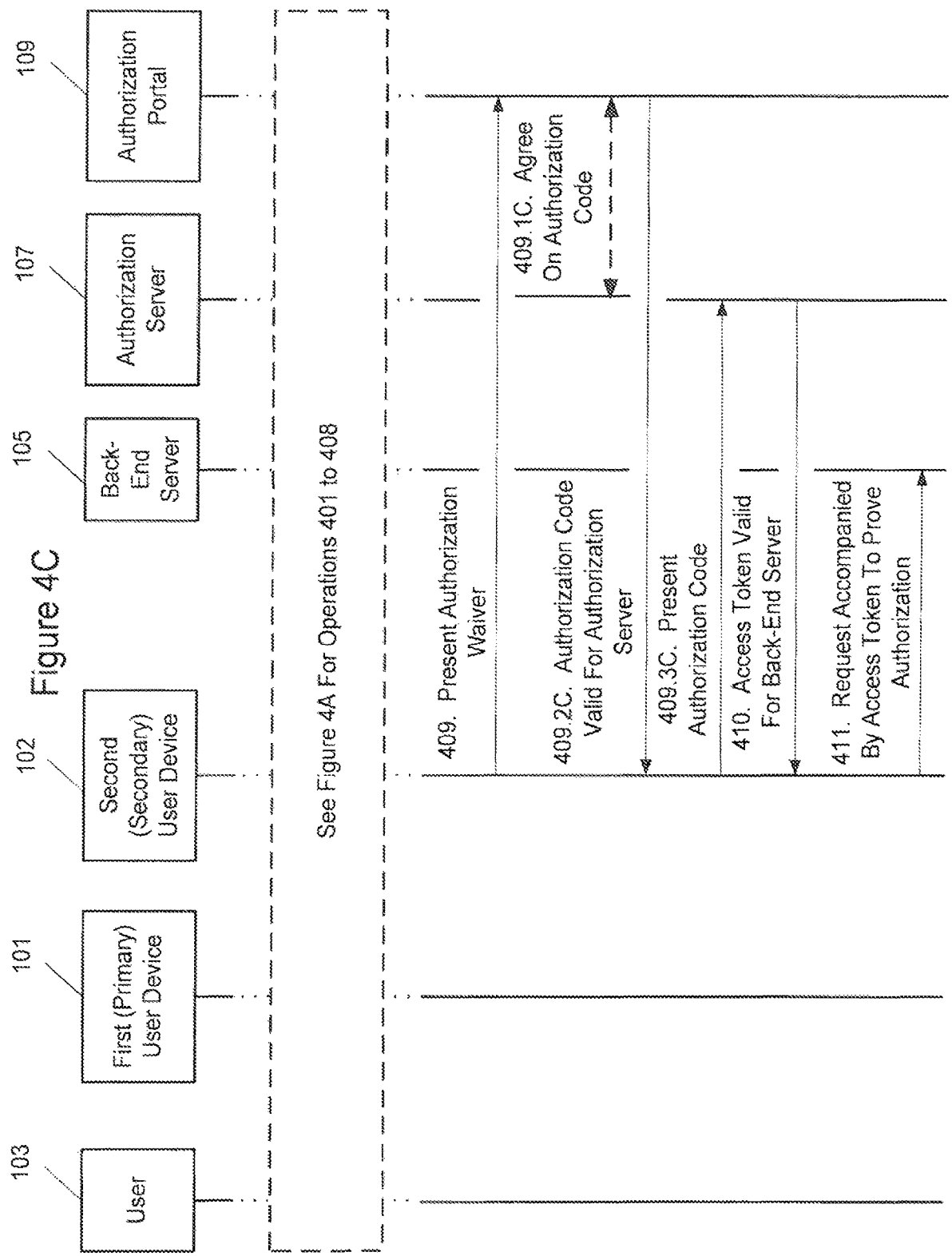

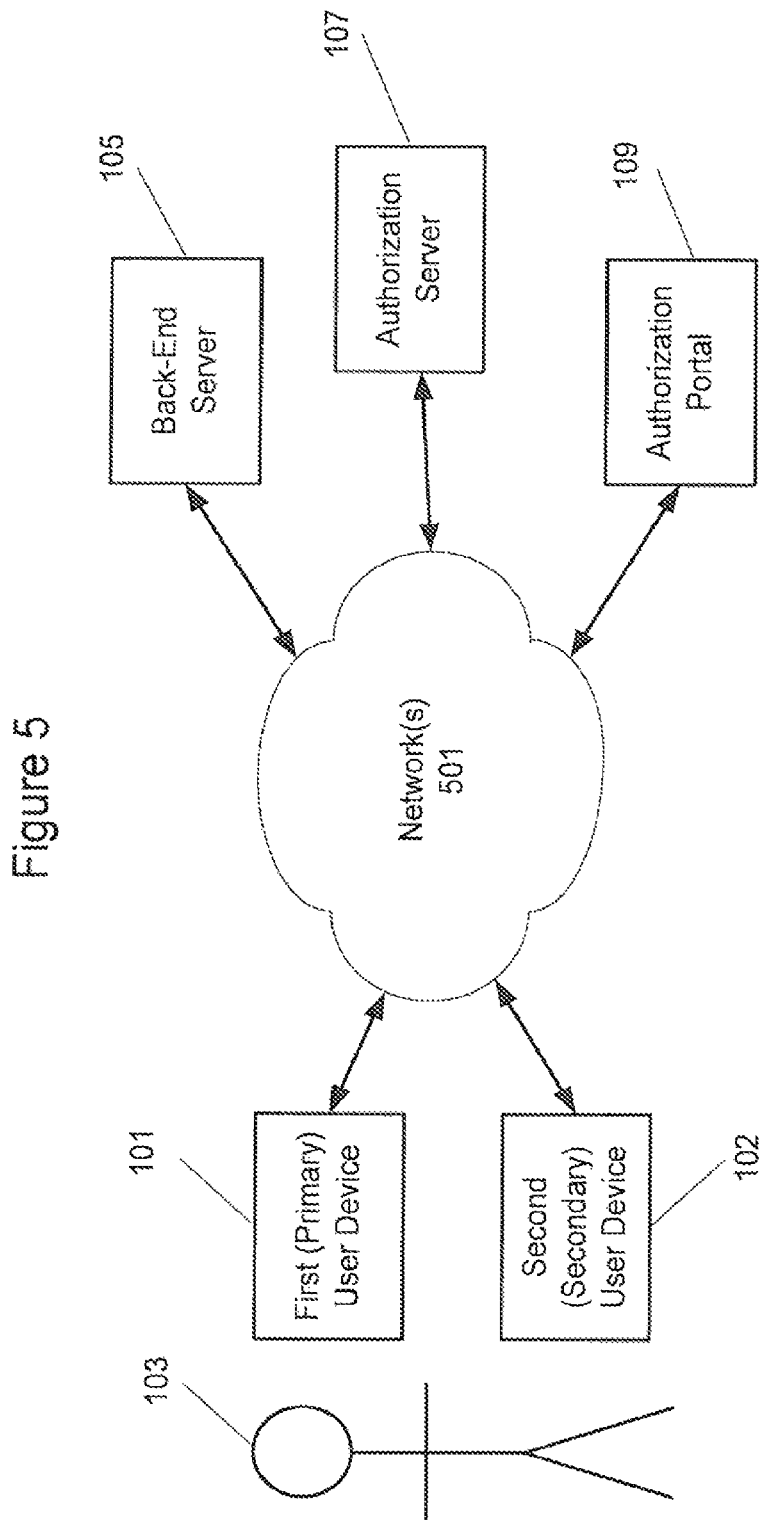

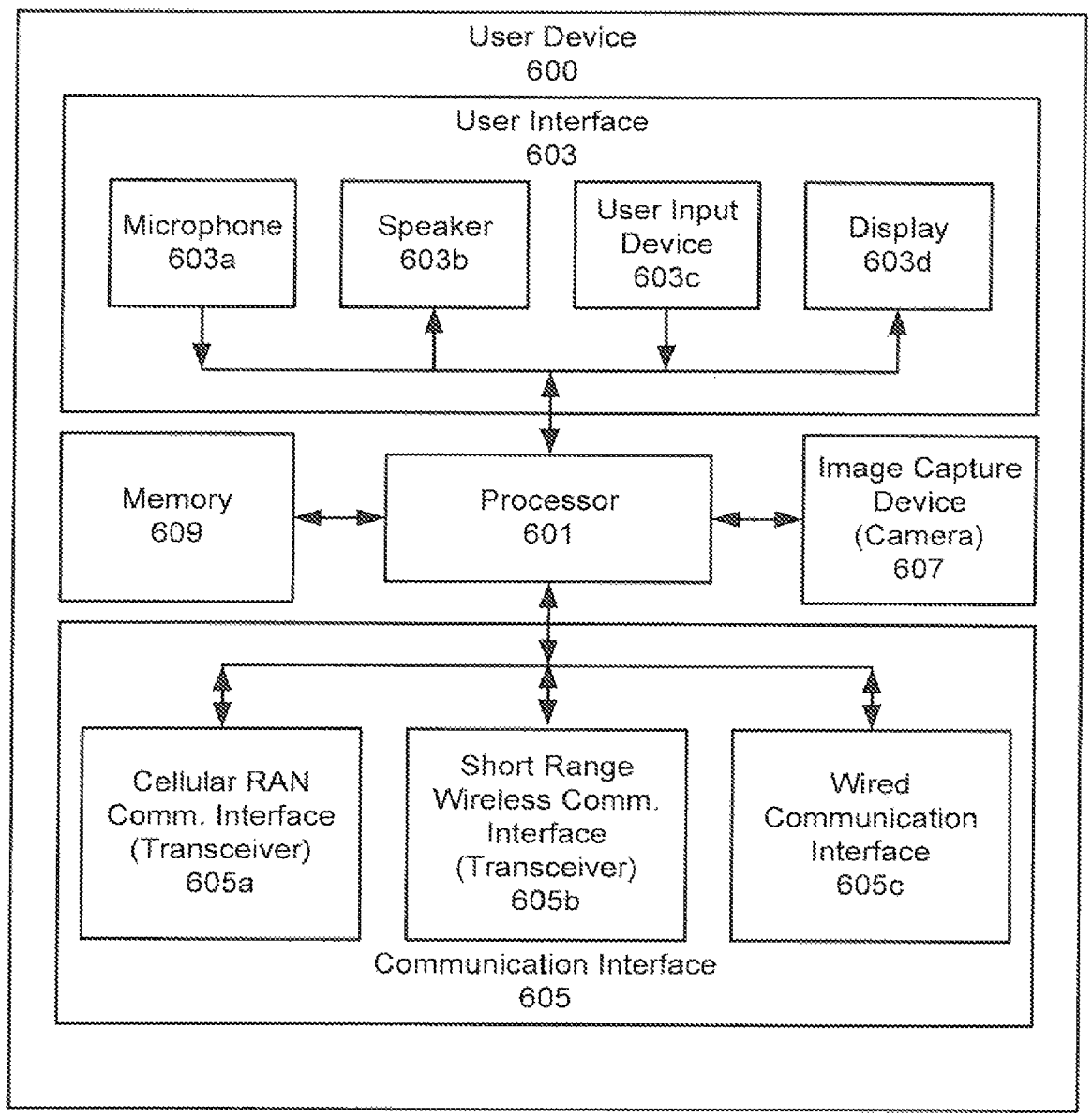

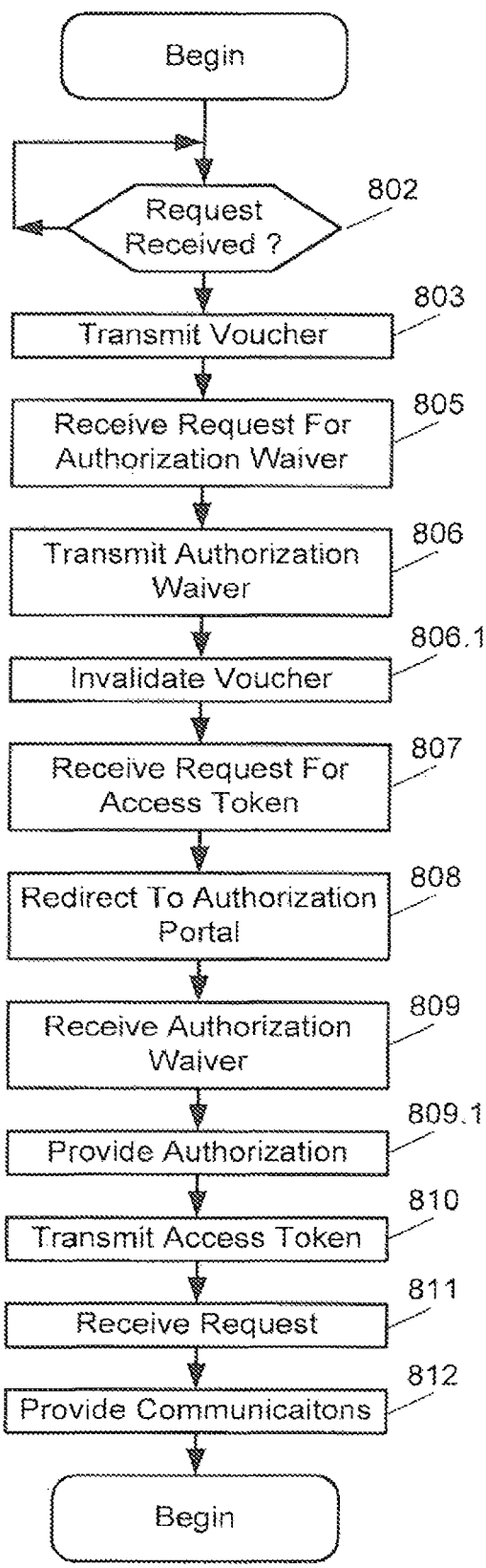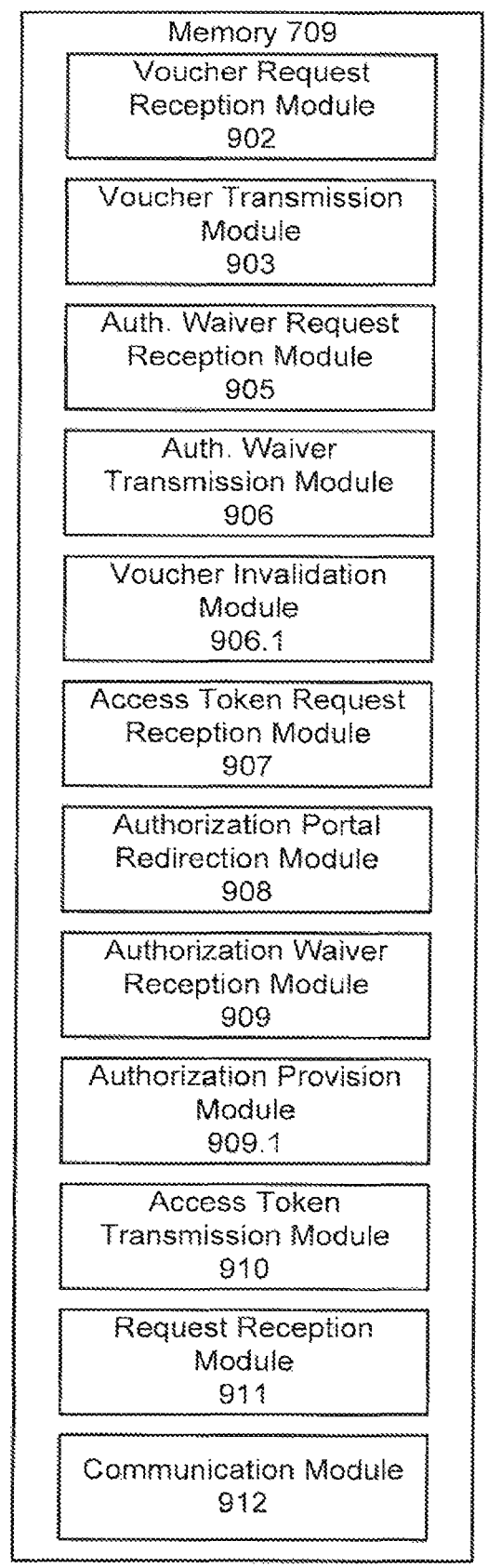

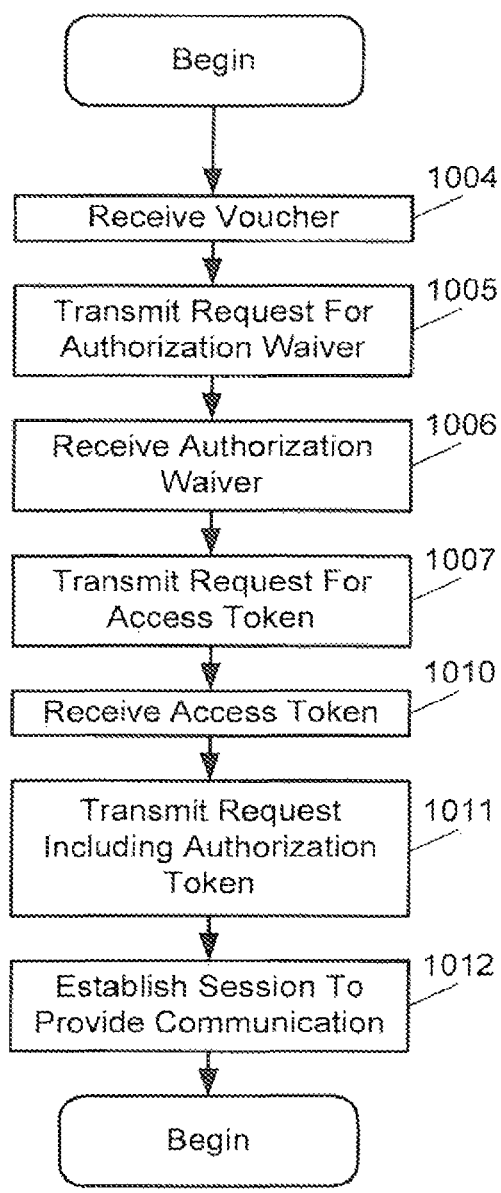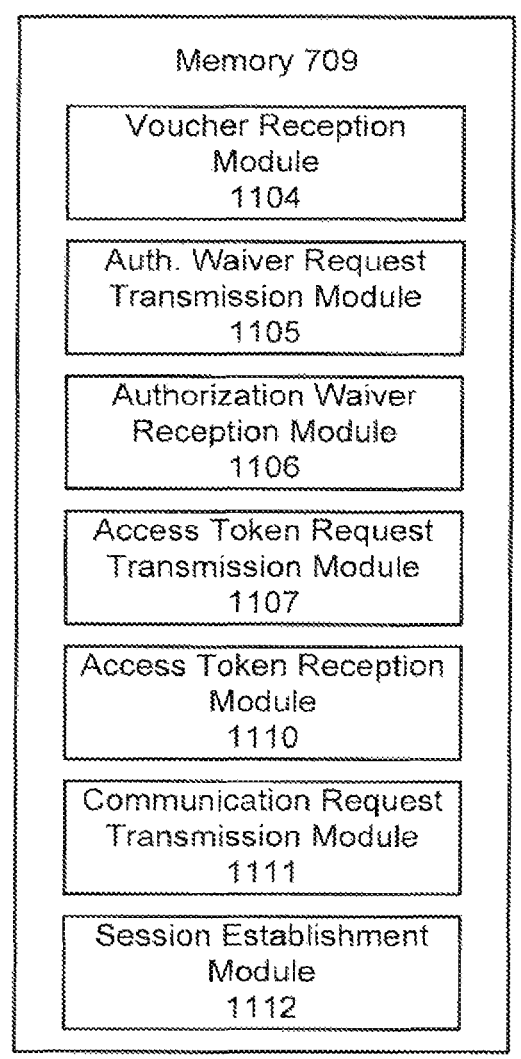

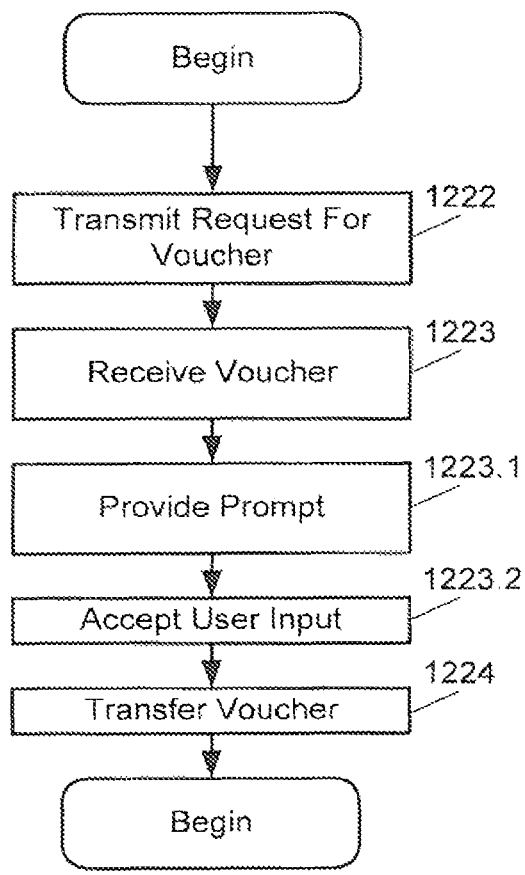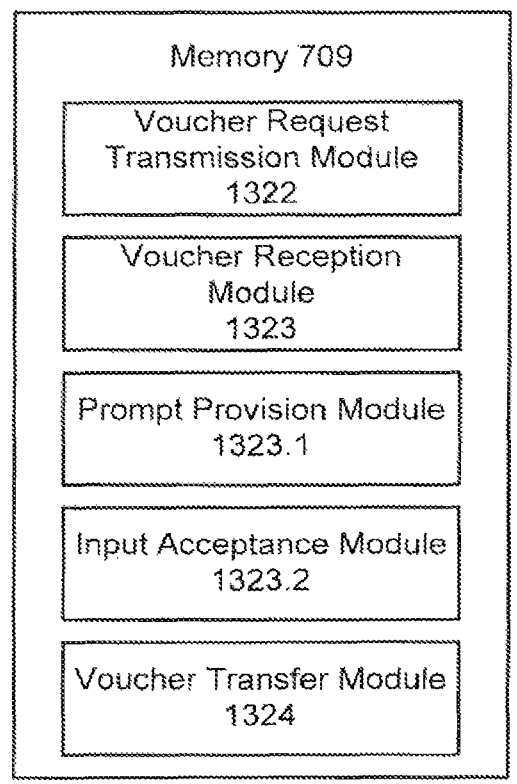

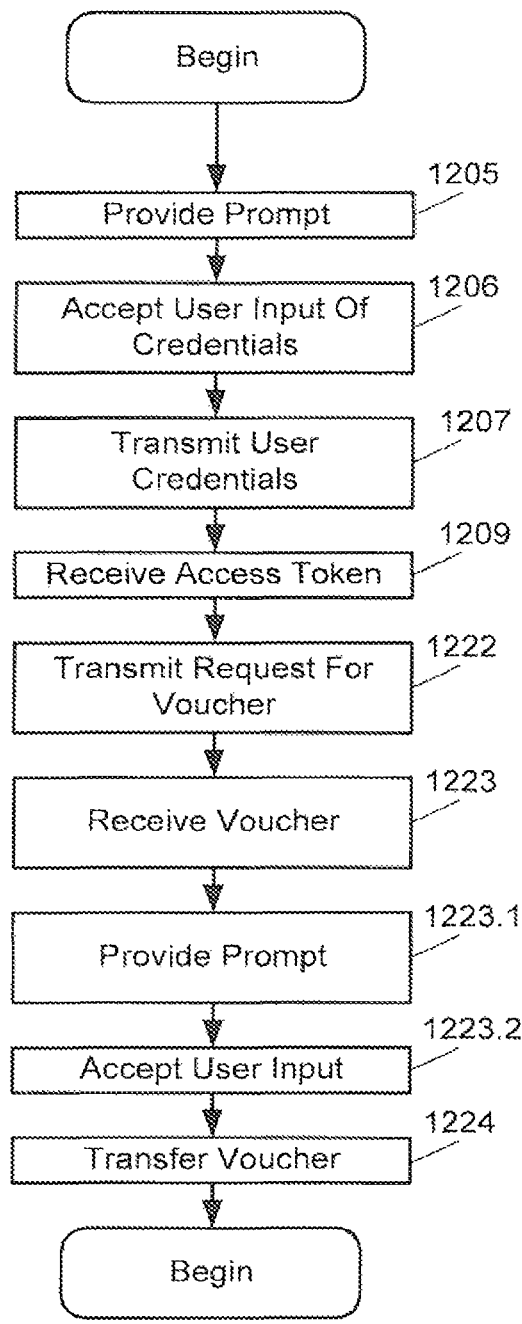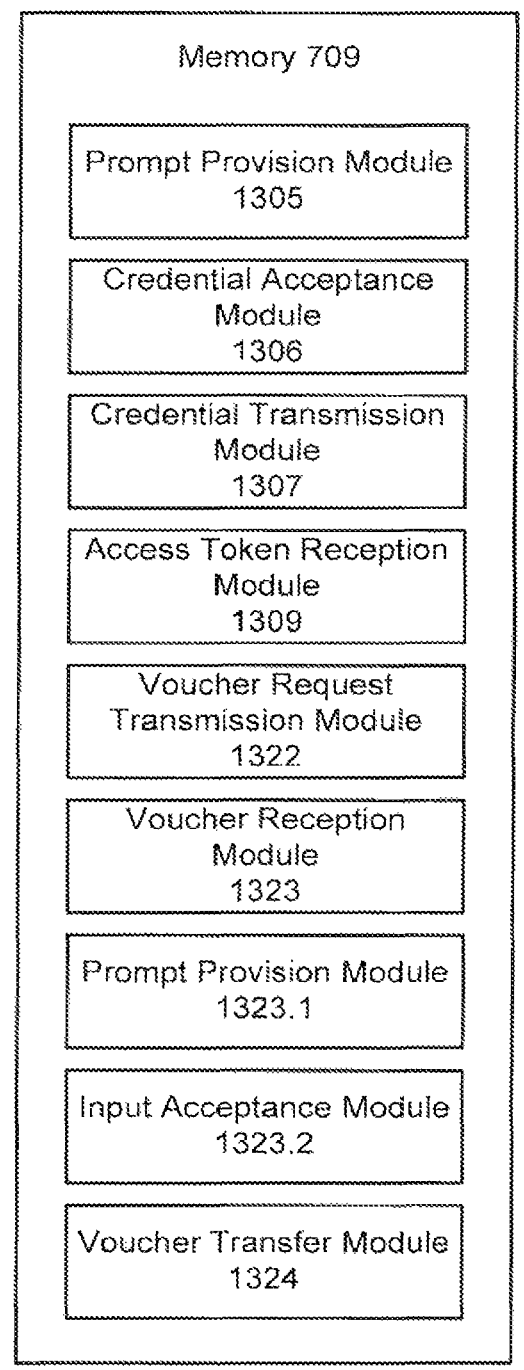

METHODS TO AUTHORIZING SECONDARY USER DEVICES FOR NETWORK SERVICES AND RELATED USER DEVICES AND BACK-END SYSTEMS

CROSS REFERENCE TO RELATED APPLICATIONS

This application is a Continuation of U.S. patent application Ser. No. 15/764,595 filed on Mar. 29, 2018, which is a 35 U.S.C. § 371 national stage application of PCT International Application No. PCT/SE2016/050846 filed on Sep. 9, 2016, which in turns claims domestic priority to U.S. Provisional Patent Application No. 62/240,155, filed on Oct. 12, 2015, the disclosures and content of which are incorporated by reference herein in their entirety.

TECHNICAL FIELD

The present disclosure generally relates to communications, and more particularly, to a method for authorizing a secondary user device for a network service provided over a network and related methods, devices, and systems.

BACKGROUND

Some embodiments disclosed herein may be related to authorization/authentication of mobile and/or fixed user devices (e.g., including smartphones, tablet computers, laptop computers, desktop computers, etc.) for access to network services, such as IP-based communication services, (e.g., including Wi-Fi calling and other IMS-based voice, video and/messaging services).

There is an increasing demand for communication services that are flexibly usable across multiple user devices of diverse types. For example, multiple solutions exist to provide that voice and/or video calls to a specific service identifier (e.g., a Mobile Subscription ISDN Number or MSISDN) are directed toward multiple user devices registered for the service by the user that owns that identifier, so that the user can decide from which specific user device he/she wants to pick-up the call at his/her convenience.

Types of user devices relevant in this context may include smartphones, tablet computers, laptop computers, desktop computers, set-top-boxes, gaming consoles, etc. Relevant user devices may include both user devices equipped with SIM (Subscriber Identity Module) cards and user devices not equipped with SIM cards.

In general, although technical details of a user device enrollment process may vary from case to case, a common denominator may be that the user is expected to enter some credentials on each and every user device he/she wants to be usable for a specific service so that the system supporting the service can securely recognize those user devices as being used by the user. Entry of credentials on multiple user devices may be sufficiently cumbersome, however, that some users may be discouraged from setting up multiple user devices for a desired service.

SUMMARY

According to some embodiments of inventive concepts, a method of authorizing a secondary user device for a network service provided over a network may be provided. Responsive to receiving a request from a primary user device, a voucher may be transmitted over the network to the primary user device. A request for an authorization waiver may be received from the secondary user device over the network wherein the request for the authorization waiver includes the voucher that was transmitted to the primary user device. Responsive to receiving the request from the secondary user device including the voucher, an authorization waiver may be transmitted to the secondary user device.

The primary user device and the secondary user device may be different.

The voucher may be related to authorization of the secondary user device.

The authorization waiver may include a session cookie.

The network service may be provided for a user of both of the primary and secondary user devices. In addition, the voucher may be invalidated responsive to receiving the request for an authorization waiver including the voucher. Moreover, invalidating the voucher may include invalidating the voucher with respect to the user so that the voucher is not reused for the network service with respect to the user.

Transmitting the voucher may include transmitting the voucher from a back-end server to the primary user device. Receiving the request from the secondary user device may include receiving the request from the secondary user device at the back-end server, and transmitting the authorization waiver may include transmitting the authorization waiver from the back-end server to the secondary user device.

The authorization waiver may include a session cookie. In addition, a request for an access token may be received from the secondary user device, and the request for an access token may include the session cookie. Responsive to receiving the request for an access token, an access token may be transmitted to the secondary user device wherein the access token is valid for the back-end server.

Receiving the request for an access token may include receiving the request for an access token from the secondary user device over the network at an authorization server, and transmitting the access token may include transmitting the access token from the authorization server over the network to the secondary user device.

Responsive to receiving the request for an access token, the secondary user device may be redirected to an authorization portal. The authorization waiver including the session cookie may be received at the authorization portal from the secondary user device. Authorization for the secondary user device may be provided based on the session cookie, and transmitting the access token may include transmitting the access token responsive to providing the authorization based on the session cookie.

The back-end server may be an element of a back-end system supporting operation of the network service.

The back-end server and the authorization server may be elements of a back-end system supporting operation of the network service.

The back-end server, the authorization server, and the authorization portal may include elements of a back-end system supporting operation of the network service.

A request may be received from the secondary user device wherein the request includes the access token. Responsive to receiving the request including the access token, communication for the secondary user device may be provided through the network in accordance with the network service.

The network service may include at least one of a voice, video, and/or messaging service.

Receiving the request including the access token may include receiving the request including the access token at the back-end server over the network from the secondary user device.

According to some embodiments, a back-end system for a network service provided over a network may include a network interface configured to provide communication over the network, and a processor coupled with the network interface. The processor may be configured to transmit a voucher through the network interface over the network to the primary user device responsive to receiving a request from a primary user device. The processor may also be configured to receive a request for an authorization waiver through the network interface from the secondary user device over the network wherein the request for the authorization waiver includes the voucher that was transmitted to the primary user device. The processor may also be configured to transmit an authorization waiver to the secondary user device responsive to receiving the request from the secondary user device including the voucher.

According to some other embodiments, a back-end system for a network service provided over a network may be adapted to transmit a voucher over the network to the primary user device responsive to receiving a request from a primary user device. The back-end system may also be adapted to receive a request for an authorization waiver from the secondary user device over the network wherein the request for the authorization waiver includes the voucher that was transmitted to the primary user device. The back-end system may also be adapted to transmit an authorization waiver to the secondary user device responsive to receiving the request from the secondary user device including the voucher.

According to still other embodiments of inventive concepts, a method may be provided to operate a secondary user device to provide authorization for a network service. A voucher may be received from a primary user device. A request for an authorization waiver may be transmitted over the network to a back-end system for the network service, wherein the request for the authorization waiver includes the voucher. After transmitting the request for the authorization waiver, an authorization waiver may be received from the back-end system.

The authorization waiver may include a session cookie. A request for an access token may be transmitted to the back-end system, wherein the request for an access token includes the session cookie.

An access token may be received from the back-end system. A request may be transmitted to the back-end system, wherein the request includes the access token. A session may be established using the access token to provide communication through the network in accordance with the network service.

A request for an access token may be transmitted to the back-end system, wherein the request for an access token includes a session cookie, and wherein receiving the access token includes receiving the access token after transmitting the request for an access token.

The back-end system may include a back-end server, transmitting the request for an authorization waver may include transmitting the request to the back-end server, and receiving the authorization waver may include receiving the authorization waiver from the back-end server.

Receiving the access token may include receiving the access token from the back-end server, and the access token may be valid for the back-end server.

Receiving the voucher may include receiving the voucher directly from the primary user device.

Receiving the voucher directly from the primary user device may include receiving the voucher directly from the primary user device without user input of the voucher through a user interface of the secondary user device.

Receiving the voucher may include receiving the voucher from the primary user device via a short range communication interface. The short range communication interface may include one of a Near Field Communications, NFC, interface, a Bluetooth interface, or an infrared interface.

Receiving the voucher may include receiving the voucher optically from a display of the primary user device using an image capture device on the secondary user device.

Transmitting the request for an authorization waiver may include transmitting the request automatically without user intervention responsive to receiving the voucher from the primary user device.

Transmitting the request for an access token may include transmitting the request for the access token automatically without user intervention responsive to receiving the authorization waiver.

Transmitting the request including the access token may include transmitting the request automatically responsive to receiving the access token.

The network service may include at least one of a voice, video, and/or messaging service.

According to some embodiments, a secondary user device may include a communication interface configured to provide communication over a network, and a processor coupled with the communication interface. The processor may be configured to receive a voucher from a primary user device through the communication interface, and transmit a request for an authorization waiver through the communication interface over the network to a back-end system for the network service. Moreover, the request for the authorization waiver may include the voucher. The processor may be configured to receive an authorization waiver through the communication interface from the back-end system after transmitting the request for the authorization waiver.

According to some other embodiments, a secondary user device may be adapted to receive a voucher from a primary user device and transmit a request for an authorization waiver over the network to a back-end system for the network service. Moreover, the request for the authorization waiver may include the voucher. The secondary user device may also be adapted to receive an authorization waiver from the back-end system after transmitting the request for the authorization waiver.

According to yet other embodiments of inventive concepts, a method of operating a primary user device may provide authorization for a network service on a secondary on a secondary user device. A request for a voucher may be transmitted over a network (501) to a back-end system. After transmitting the request for a voucher, a voucher may be received over the network from the back-end system, and the voucher may be transmitted to the secondary user device.

Transmitting the request for a voucher may include transmitting the request responsive to user input to assist authorization of the secondary user device.

Responsive to receiving the voucher, a prompt for user input may be provided to initiate transferring the voucher to the secondary user device. User input may be accepted to initiate transferring the voucher to the secondary user device based on the prompt, wherein transferring the voucher includes transferring the voucher responsive to accepting the user input to initiate transferring the voucher.

Transferring the voucher may include transferring the voucher directly to the secondary user device. Transferring the voucher directly may include transferring the voucher directly to the secondary user device without user input of the voucher through a user interface at the secondary user device.

Transferring the voucher may include transferring the voucher to the secondary user device via a short range communication interface, such as a Near Field Communications (NFC) interface, a Bluetooth interface, or an infrared interface.

Transferring the voucher may include providing an image including the voucher on a display of the primary communication device. The voucher may be encoded in the image.

The voucher may be related to authorization of the of the secondary user device.

An access token may be received from the back-end system, and the request for a voucher may include the access token.

A prompt for user input of credentials for the network service may be provided, and user input of credentials for the network service may be accepted through a user interface of the primary user device. The user credentials for the network service may be transmitted over the network to the back-end system. Moreover, receiving the access token may include receiving the access token after transmitting the user credentials for the network service. The user credentials for the network service may include a username and a password associated with the user for the network service.

According to some embodiments, a primary user device may include a communication interface configured to provide communication over a network, and a processor coupled with the communication interface. The processor may be configured to transmit a request for a voucher through the communication interface over a network to a back-end system and to receive a voucher through the communication interface over the network from the back-end system after transmitting the request for a voucher. The processor may also be configured to transfer the voucher to the secondary user device.

According to some other embodiments, a primary user device may be adapted to transmit a request for a voucher over a network to a back-end system, receive a voucher over the network from the back-end system after transmitting the request for a voucher, and transfer the voucher to the secondary user device.

According to some embodiments disclosed herein, a user may activate and/or manage a communication service on a secondary user device without the need to enter credentials for the secondary user device, provided that the user has already authenticated on a primary user device. Usability of a secondary user device for a communication service may thus be improved without significantly impacting security, and a user experience may thus be improved.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 4A, 4B, and 4C are message flow diagrams illustrating operations providing an access token for a secondary user device according to some embodiments of inventive concepts;

FIG. 5 is a schematic diagram illustrating first and second user devices in a network environments according to some embodiments of inventive concepts;

FIG. 6 is a block diagram illustrating elements of a user device according to some embodiments of inventive concepts;

FIG. 8 is a flow chart illustrating operations of a back-end system according to some embodiments of inventive concepts, and FIG. 9 is a block diagram illustrating related modules;

FIG. 10 is a flow chart illustrating operations of a secondary user device according to some embodiments of inventive concepts, and FIG. 11 is a block diagram illustrating related modules;

FIGS. 12 and 14 are flow charts illustrating operations of a primary user device according to some embodiments of inventive concepts, and FIGS. 13 and 15 are block diagrams illustrating related modules.

DETAILED DESCRIPTION OF EMBODIMENTS

Figure 1:
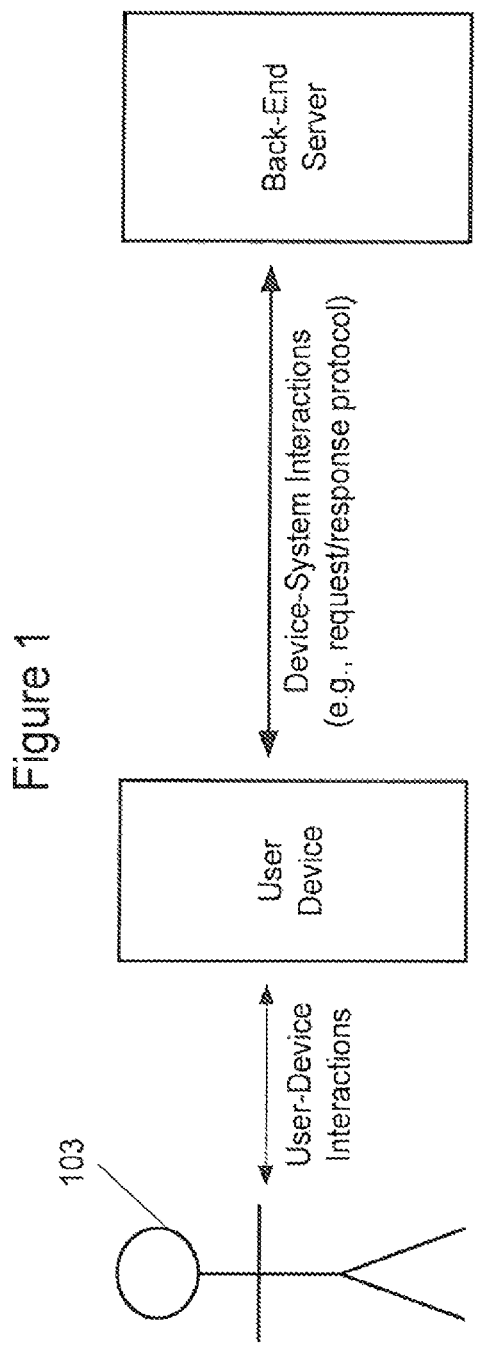
FIG. 1 is a schematic diagram illustrating interaction between a user device and a back-end server according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

FIG. 5 is a schematic diagram illustrating first (primary) and second (secondary) user devices 101 and 102 under control of a same user 103 wherein first and second user devices 101 and 102 are configured for communication over network(s) 501. By way of example, each of first and second user devices 101 and 102 may be a smartphone, a tablet computer, a laptop computer, a desktop computer, etc., and each of first and second user devices 101 and 102 may be configured to network communication via a wired (e.g., Local Area Network) and/or wireless (cellular radio access network RAN, wireless local area network WLAN, WiFi, etc.) interface. Moreover, network(s) 501 may include one or more of a cellular radio access network RAN, wireless local area network WLAN, wired local area network LAN, the Internet, etc. Moreover, a network service or services (such as an IP-based communication service) may be supported by back-end server 105, authorization server 107, and authorization portal 109, each of which is also coupled to network(s) 501.

FIG. 6 is a block diagram illustrating a user device 600 (either of user device 101 or user device 102) of FIG. 5 according to some embodiments. As shown, user device 600 may include processor 601 coupled with user interface 603, communication interface 605, and memory 609. In addition, user device may include image capture device (e.g., a camera) 607 coupled with processor 601. As shown, user interface may include one or more of microphone 603a, speaker 603b, user input device 603c, and/or display 603c. User input device may include a keypad, keyboard, mouse, trackball, button(s), etc., and/or display 603d and portions of user input device 603c may be integrated in a touch sensitive screen. Communication interface may include one or more of a cellular radio access network (RAN) interface (also referred to as a RAN transceiver), a short range wireless communication interface (e.g., a Near Field Communication NFC transceiver, a BlueTooth transceiver, an infrared IR transceiver, a WiFi transceiver, etc.), and/or a wired network communication interface. User device 600 can thus provide communication through network(s) 501 using communication interface 605 (e.g., using one or more of cellular RAN communication interface 605a, short range wireless communication interface 605b, and/or wired communication interface 605c). In addition, user device 600 may be configured to communication with one or more other user devices directly (without using network(s) 501) using one or more elements of communication interface (e.g., using short range communication interface 605b and/or wired communication interface 605c).

Processor 601 (also referred to as a processor circuit or processing circuitry) may include one or more data processing circuits, such as a general purpose and/or special purpose processor (e.g., microprocessor and/or digital signal processor). Processor 601 may be configured to execute computer program instructions from functional modules in memory 609 (also referred to as a memory circuit or memory circuitry), described below as a computer readable medium, to perform some or all of the operations and methods that are described herein for one or more of the embodiments. Moreover, processor 601 may be defined to include memory so that separate memory 609 may not be required.

When a structure of a particular user device (i.e., primary/first user device 101 or secondary/second user device 102) is described, "-1" or "-2" will be respectively added to the reference number to designate the particular device. Primary user device 101, for example, may be discussed as including processor 600-1, user interface 603-1 (e.g., including one or more of microphone 603a-1, speaker 603b-1, user input device 603c-1, and/or display 603d-1), communication interface 605-1 (including one or more of cellular RAN interface 605a-1, short range communication interface 605b-1, and/or wired communication interface 605c-1), image capture device 607-1, and memory 609-1. Similarly, secondary user device 102, for example, may be discussed as including processor 600-2, user interface 603-2 (e.g., including one or more of microphone 603a-2, speaker 603b-2, user input device 603c-2, and/or display 603d-2), communication interface 605-2 (including one or more of cellular RAN interface 605a-2, short range communication interface 605b-2, and/or wired communication interface 605c-2), image capture device 607-2, and memory 609-2.

A common form of credentials includes a user identifier (such as username, email address, account number, etc.) and a password. However, several other different approaches are possible, including the use of smart cards (such as SIM cards), single-use (also referred to as one-time or one-time use) codes/tokens, biometric data (fingerprint detection, voice recognition, facial recognition), and/or digital certificates. Also, approaches used for a same service on different user devices may not necessarily be the same. For example, once authorized/authenticated with his/her username and password on a smartphone, a user could receive a unique single-use token on the smartphone (e.g., in the form of a text message) and then use that single-use token as a credential on another user device in his/her possession.

In any case, the user may perform some operations on the user device to authorize/authenticate himself/herself with a back-end system (e.g., a server, portal, etc.) and provide a presumption/indication/proof that he/she is in control of the user device and thus in a condition to legitimately request activation, suspension, reactivation, cancellation—or whatever other relevant operation—of the service on the specific user device. The operation may be repeated—either with the same or with different types of credentials—across the set of user devices the user wants to be enrolled in the service.

Multiple different approaches may be used to reduce a number of times a user is required to authorize/authenticate himself/herself with the system providing the services he/she intends to use. Approaches may broadly fall in two categories:

- Approaches intended to reduce/avoid a need for the user to re-authorize/re-authenticate multiple times on the same user device;
- Approaches intended to reduce/avoid a need for the user to re-authorize/re-authenticate multiple times on different user devices.

An approach that may fall in the category of reducing/avoiding re-authorization/re-authentication on the same user device may include allowing the user to perform multiple consecutive operations on a single user device (e.g., activation of multiple services) without the need to re-enter credentials multiple times.

Some approaches may include creating some sort of association (also referred to as session) between the user device and the back-end authorization/authentication system and keeping it in effect for a determined amount of time or until a certain event occurs.

An embodiment of this approach may be found in communication between web browsers and web servers. A user can login on the server with some credentials, and the server can automatically assign a session "cookie" to the browser-server association and pass the session cookie to the browser. The browser can re-submit the session cookie to the server (in lieu of repeating the user authorization/authentication) for as long as the server decides to rely on the previous user authorization/authentication.

Another approach that may fall into the category of reducing/avoiding re-authorization/re-authentication on different user devices may include allowing the user to activate a service on a user device without entering credentials if the user has another user device (on which he/she has successfully authorized/authenticated) that can serve as a "trust anchor" (also referred to as an "anchor device" or an "anchor user device").

This approach may include using the anchor user device (also referred to as a primary user device or a first user device) to obtain a single-use code (also referred to as a one-time code or a one-time use code) from the back-end authorization/authentication system and then using that single-use code on the second user device (also referred to as a secondary user device) on which the user wants to perform the activation as a streamlined form of authorization/authentication. In other words, the user can enter the single-use code for the secondary user device instead of entering his/her full credentials for the secondary user device.

Some embodiments of present inventive concepts may be related to reducing/avoiding re-authorization/re-authentication on different user devices. More particularly, some embodiments disclosed herein may define methods that securely enable a user to manage services on a second user device (also referred to as "secondary device" or "secondary user device") by relying on an authorization/authentication toward a back-end system the user has previously performed on a first user device (also referred to as a "primary device", "primary user device", "anchor device", "anchor user device", etc.) rather than requiring the user to re-enter his/her credentials on the secondary user device. As noted above, some approaches may rely on obtaining a single-use code on the primary user device and using the single-use code as a form of streamlined authorization/authentication on the secondary user device. Such re-authorization/re-authentication for the secondary user device, however, may be inconvenient and/or annoying.

Figure 7:
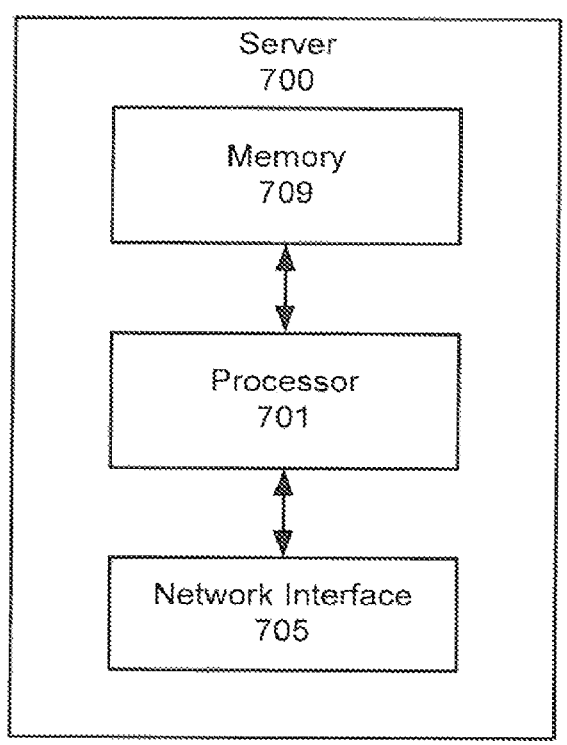
FIG. 7 is a block diagram illustrating elements of a server according to some embodiments of inventive concepts.

FIG. 7 is a block diagram illustrating a server (e.g., back-end server 105, authorization server 107, and/or authorization portal 109), also referred to as a network node of FIG. 5 according to some embodiments. As shown, server 700 may include processor 701 coupled with network interface 705, and memory 709. Server 700 may thus provide communication through network(s) 501 using network interface 705. Processor 701 (also referred to as a processor circuit or processing circuitry) may include one or more data processing circuits, such as a general purpose and/or special purpose processor (e.g., microprocessor and/or digital signal processor). Processor 701 may be configured to execute computer program instructions from functional modules in memory 709 (also referred to as a memory circuit or memory circuitry), described below as a computer readable medium, to perform some or all of the operations and methods that are described herein for one or more of the embodiments. Moreover, processor 701 may be defined to include memory so that separate memory 709 may not be required.

When a structure of a particular server (i.e., back-end server 105, authorization server 107, and/or authorization portal 109) is described, "-5", "-7", or "-9" will be respectively added to the reference number to designate the particular device. Back-end server 105, for example, may be discussed as including processor 701-5, network interface 705-5, and memory 709-5. Similarly, authorization server 107 may be discussed as including processor 701-7, network interface 705-7, and memory 709-7, and authorization portal 109 may be discussed as including processor 701-9, network interface 705-9, and memory 709-9. Moreover, while back-end server, authorization server, and authorization server may be implemented as separate servers, functionality of one or more of these elements may be combined in a same server.

According to some embodiments of inventive concepts, primary user device 101 may be used to request and obtain a single-use voucher for secondary user device 102 from the back-end system (e.g., back-end server 105), and that voucher may then be passed from primary user device 101 to secondary user device 102 without a need for the user to manually enter any value or code. Thereafter, secondary user device 102 can present the voucher to the back end system (e.g., back-end server 105) as:
  an identifier for the user that is requesting the operation;
  an indication/presumption/proof that the user is in possession of both primary user device 101 (on which he/she successfully authorized/authenticated) and secondary user device 102 by virtue of the fact that he/she has deliberately moved the voucher from primary user device 101 to secondary user device 102.
Secondary user device 102 may then exchange the voucher for an authorization code, access token or session cookie deliberately generated by the back-end system (e.g., back-end server 105) for secondary user device 102.

Multiple approaches are possible for the exchange of the voucher from primary user device 101 to secondary user device 102. The following criteria may be provided for the exchange of the voucher between primary and secondary user devices:
  The voucher exchange from primary user device 101 to secondary user device 102 may be possible only while the two user devices are in close proximity (i.e., while the user is in direct control of both devices).
  The voucher exchange from primary user device 101 to secondary user device 102 may be reasonably protected from eavesdropping, as to reduce/prevent interception of the exchange and to reduce/prevent the possibility of the voucher ending up in an unintended device.
Examples of suitable approaches may include exchange based on direct short-range communication (e.g., Bluetooth, NFC, etc.) between the two devices and/or exchange through encoding in a still or animated image displayed on primary user device 101 and scanned on secondary user device 102 (e.g., a QR code). Moreover, by allowing only one use of the single-use voucher at back-end server 105 during a limited period of time, a likelihood of misuse may be further reduced.

According to some embodiments of inventive concepts, a user may be able to activate and manage communication services on secondary user device 102 without the need to enter credentials, provided that he/she has already authorized/authenticated on primary user device 101. This may improve the user experience.

According to some embodiments of inventive concepts, a user may authorize/authenticate himself/herself with his/her complete credentials (e.g., user name/identification and password) on primary user device 101 (e.g., a smartphone) and then activate services on secondary user device 102 (e.g., a tablet computer) without the need to manually enter any credential on secondary user device 102.

Any solution related to identity management and user authorization/authentication may involve a trade-off between usability (in terms of annoyance for the user) and security. According to some embodiments of present inventive concepts, usability may be increased without introducing significant reduction of security.

According to some embodiments of inventive concepts, a single sign-on for multiple user devices (also referred to as communication devices) may be implemented as part of a system in which user devices (including smartphones, tablet computers, laptop computers, desktop computers, set-top-boxes, gaming consoles, etc.) interact with a back-end server to execute operations requested by the corresponding users.

According to examples of some embodiments of inventive concepts discussed herein, a user may change settings of his/her smartphone to have a Wi-Fi calling service (or other network service) enabled and the smartphone may interact with a service activation server to obtain the activation. However, this should be understood merely as an example, and the applicability of proposed embodiments are in no way limited to the disclosed examples of communication devices and services.

According to some embodiments of inventive concepts, an interaction between a primary user device (e.g., a smartphone) and a back-end server may be subject to authorization/authentication so that the back-end server can reliably determine whether a request was originated by a user device under control of a legitimate user, as shown in FIG. 1.

Figure 2:
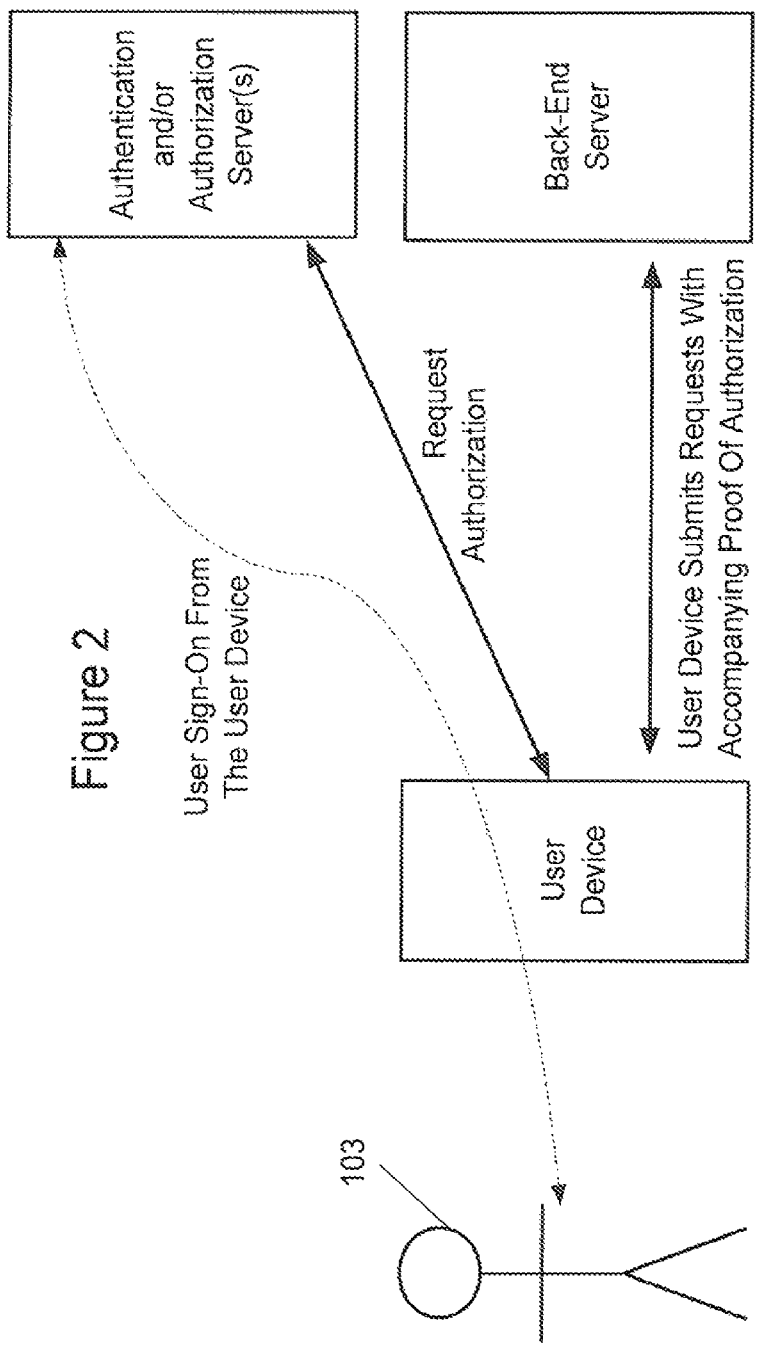
FIG. 2 is a schematic diagram illustrating collection and processing of user credentials according to some embodiments of inventive concepts.

A back-end of the system may include an authentication and/or authorization function (e.g., implemented using an authorization server and an authorization portal) used to collect and process user credentials to verify the identity of the user that is in control of the user device, as shown in FIG. 2. In FIG. 2 with authentication and authorization functions in the system back-end, authorization of a user device to interact with the back-end server may require user authorization/authentication toward the authentication and authorization function to be performed from that specific user device.

Figure 3:
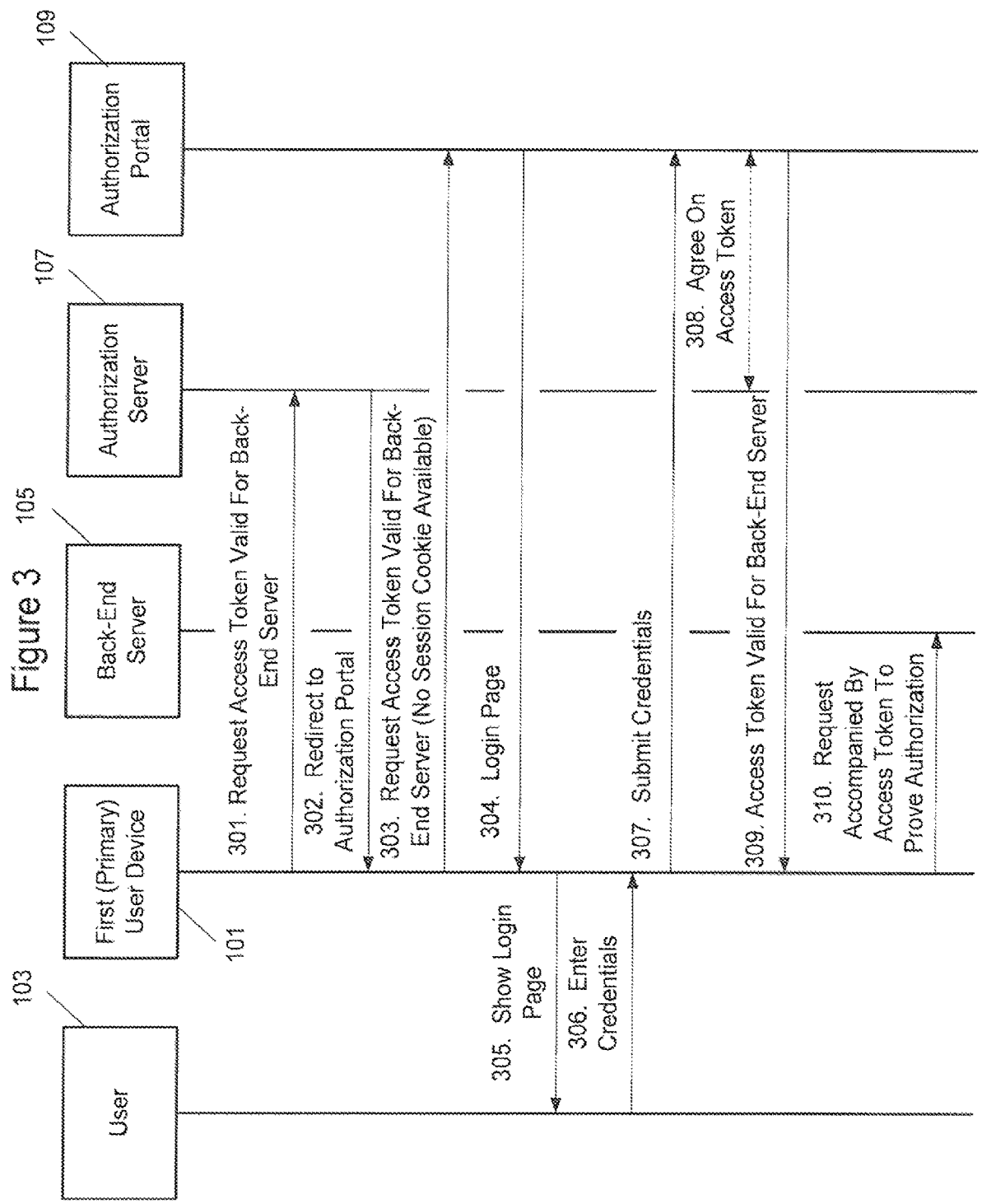
FIG. 3 is a message flow diagram illustrating operations providing an access token for a primary user device according to some embodiments of inventive concepts.

According to some embodiments of inventive concepts, authentication and authorization functions may be provided based on an OAuth authorization server compliant with RFC 6749, The OAuth 2.0 Authorization Framework, https:// tools.ietf.org/html/rfc6749, October 2012. In embodiments illustrated in FIG. 3, primary user device 101 may use access tokens to prove the legitimacy of its requests to back-end server 105. Operations according to an example of such embodiments are provided as follows:

Operation 301. Primary user device 101 contacts authorization server 107 to request an access token valid for back-end server 105.

Operation 302. Authorization server 107 redirects primary user device 101 to authorization portal 109.

Operation 303. Primary user device 101 connects to authorization portal 109 and requests an access token that is valid for back-end server 105 (if no session cookie is available).

Operation 304. Authorization portal 109 provides a login page for primary device 101 to present to the user.

Operation 305. Primary user device 101 presents the login page on a display as a prompt for the user to enter login credentials (e.g., username and password).

Operation 306. Primary user device 101 accepts user entry of login credentials from the user 103 via a user interface (e.g., via keypad and/or touch sensitive display of primary user device).

Operation 307. Primary user device 101 submits the user's login credentials to authorization portal 109 to authorize/authenticate the user.

Operation 308. Responsive to authorization portal 109 successfully validating the user's login credentials, authorization portal 109 and authorization server 108 agree on an access token to be used by primary user device 101.

Operation 309. Responsive to agreeing on the Access Token, authorization portal 109 provides the access token (usable for a certain period of time) to primary user device 101 to allow primary user device 101 to submit requests to back-end server 105.

Operation 310. Primary user device 101 may submit request(s) accompanied by the access token to back-end server 105 relating to the service.

In general, if a user has more than one user device, operations discussed above with respect to FIG. 3 may be repeated on a per user device basis. Some proposed embodiments may offer an alternative approach where the user authorization/authentication on a first user device (e.g., a primary user device) can be used to avoid re-authorization/re-authentication on other user devices (e.g., secondary user devices).

According to embodiments of inventive concepts illustrated in FIG. 4A, primary user device 101 may obtain a single-use voucher (also referred to as a one-time voucher, or a one-time use voucher) for secondary user device 102, and secondary user device 102 may use the single-use voucher to obtain an access token valid for back-end server 105. Operations for such embodiments are discussed below:

Operation 401. The user takes device 101 (herein referred to as "first device" or a "primary device") which he/she has already authorized/authenticated for a network service (e.g., as discussed above with respect to FIG. 3) and, using some device settings or dedicated application, indicates his/her intention to authorize another device 102 (herein referred to a "second device" or a "secondary device") to interact with the system (e.g., network service) on his/her behalf.

Operation 402. First device 101 contacts back-end server 105 and requests a single-use authorization voucher for second device 102.

Operation 403. Back-end server 105 generates the single-use voucher and returns the single-use voucher to first device 101.

Operation 404. First user device 101 prompts the user to transfer/pass the single-use voucher from first device 101 to second user device 102 (operation 403.1), and accepts user input to transfer the voucher (operation 403.2), so that the voucher is transferred from first user device 101 to second user device 102 (Operation 404). In an example embodiment, the transfer may be achieved by displaying a QR code with the voucher encoded in the QR code on a display of first user device 101 and requesting the user to align a camera of second user device 102 to scan the QR code and thus acquire the voucher at second user device 102. Other possible mechanisms may include use of a short-range communication mechanism such as Bluetooth or NFC (near field communication) to transfer the voucher. According to some embodiments, the selected transfer mechanism may provide that the transfer of the voucher from first user device 101 to second user device 102 may be possible only while the user is in direct control of both devices.

Operation 405. Second user device 101 may use the single-use voucher to contact back-end server 105 and request a waiver from the requirement to have the user authorize/authenticate himself/herself on second user device 102, and back-end server 105 and authorization portal 109 may agree to the waiver (Operation 405.1).

Operation 406. The waiver is returned to second user device 102 in the form of a session cookie that second user device 102 can present to the authorization portal 109.

Operation 406.1. Back-end server 105 may invalidate the voucher with respect to user 103 so that the voucher is not reused for the network service with respect to user 103.

Operation 407. Second user device 102 contacts authorization server 107 to request an access token valid for back-end server 407.

Operation 408. Authorization server 107 redirects second user device 102 to authorization portal 109.

Operation 409. Second user device 102 presents the session cookie (obtained at operation 406) to authorization portal 109.

Operation 409.1. Authorization portal 109 recognizes and authorizes/authenticates second user device 102 from the session cookie without requesting entry of any credential.

Operation 410. Authorization server 107 provides the access token (valid for back-end server 105) to second user device 102, wherein the access token is valid for a certain period of time.

Operation 411. Second user device 102 submits the access token to back-end server 105 to access the service. Stated in other words, the access token is used by second user device 102 to prove authorization to use the service without requiring user entry of credentials through second user device 102.

Operation 412. Back-end server may provide for secondary user device 102 through network 501 in accordance with the network service.

FIG. 4B is a message diagram illustrating operations according to some other embodiments of inventive concepts. In embodiments of FIG. 4B, operations 401 to 409 and 411 may be the same as discussed above with respect to FIG. 4A. Operations of FIG. 4B are discussed below:

Operation 409. Second user device 102 presents the session cookie (obtained at operation 406) to authorization portal 109, as discussed above with respect to FIG. 4A.

Operation 409.1B. Authorization portal 109 recognizes and authorized/authenticates second user device 102 from the session cookie without requesting entry of any credential, and authorization server 107 and authorization portal 109 agree on an access token for second user device 102.

Operation 410B. Authorization portal 109 provides the access token (valid for back-end server 105) to second user device 102, wherein the access token is valid for a certain period of time.

Operation 411. Second user device 102 submits the access token to back-end server 105 to access the service. Stated in other words, the access token is used by second user device 102 to prove authorization to use the service without requiring user entry of credentials through second user device 102.

According to FIG. 4B, the access token is thus returned by authorization portal 109 (after handshake with authorization server 107).

FIG. 4C is a message diagram illustrating operations according to some other embodiments of inventive concepts. In embodiments of FIG. 4C, operations 401 to 409 may be the same as discussed above with respect to FIG. 4A, and Operation 411 may be the same as operation 411 of FIG. 4A. Operations of FIG. 4C are discussed below:

Operation 409. Second user device 102 presents the session cookie (obtained at operation 406) to authorization portal 109, as discussed above with respect to FIG. 4A.

Operation 409.1C. Authorization portal 109 recognizes and authorizes/authenticates second user device 102 from the session cookie without requesting entry of any credential, and authorization server 107 and authorization portal 109 agree on an authorization code for second user device 102, wherein the authorization code is valid for authorization server 107.

Operation 409.2C. Authorization portal 109 provides the authorization code to second user device 102

Operation 409.3C. Second user device 102 presents the authorization code to authorization server 107.

Operation 410B. Responsive to receiving the authorization code from second user device 102, authorization server 107 provides the access token (valid for back-end server 105) to second user device 102, wherein the access token is valid for a certain period of time.

Operation 411. Second user device 102 submits the access token to back-end server 105 to access the service. Stated in other words, the access token is used by second user device 102 to prove authorization to use the service without requiring user entry of credentials through second user device 102.

According to FIG. 4C, authorization portal 109 returns an authorization code, and the authorization code can be exchanged for the access token which is returned by authorization server 107.

It should be noted that some embodiments may omit any step at which second user device 102 uses a token, code or cookie that was generated by the system for use on first user device 103. For example, the session cookie (returned to second user device 102 by back-end server 105) can be crafted to be usable only on that specific device (i.e., only on second user device 102), and this may be a significant characteristic of some embodiments, which may provide that the overall security posture is not unnecessarily relaxed.

Back-end server 105 may thus process the request of primary/anchor user device 101 (received at Operation 402), and generate a single-use voucher that is transmitted to primary user device 101 (at Operation 403) but usable by secondary user device 102 that is to be authorized for the network service. Back-end server 105 thus provides the single-use voucher to primary user device 101 with the expectation that the single-use voucher will be transferred from primary user device 101 to secondary user device 102 in a secure manner (at Operation 404).

Back-end server 105 can thus authorize/authenticate secondary user device 102 for the network service based on identification using the single-use voucher that was provided to primary user device 101. Without having prior knowledge of secondary user device 102, back-end server 105 can thus use the single-use voucher to recognize secondary user device 102 as being under control of a same user who controls primary user device 101.

Back-end server 105 interacts with authorization portal 109 at Operation 405.1 to obtain/generate an authorization waiver, e.g., a session cookie that is bound to the user and secondary user device 102, and the authorization/authentication waiver (e.g., session cookie) is provided to second user device 102 at Operation 406. Moreover, back-end server 105 may invalidate the single-use voucher after secondary user device 102 uses the single-use voucher to request/gain access at operations 405/406 so that the single-use voucher is not reused. For example, the single-use voucher may be invalidated with respect to user 103 of devices 101 and 102 so that the voucher is not reused for the network service with respect to user (103).

Elements of some embodiments of inventive concepts may include:

A first user device 101 on which the user has successfully authorized/authenticated with an authorization portal 109 may be used as "trust anchor" device (also referred to as "a primary user device") to reduce/avoid a need to re-authorize/re-authenticate toward the same authorization portal on second user device 102 (also referred to as a "secondary device");

A capability to transfer a single-use voucher from first user device 101 (the anchor device) to second user device 102 may be used as indication/evidence/proof that the user is in direct control of both first and second user devices;

The single-use voucher may be used by second user device 102 as a way to identify itself with a back-end system and obtain a session cookie usable to skip authorizing/authenticating with authorization portal 109;

A session cookie generated in concert by the back-end system and authorization portal and delivered to first user device (anchor device) may be used with the intent to be passed to second user device 102 (as opposed to simply passing a session cookie obtained by first user device 101 (anchor device) for itself to second user device 102);

The above mechanisms may be used in the context of obtaining OAuth access tokens usable by second user device(s) 102 to authorize/authenticate their requests toward a back-end system.

Operations of a back-end system will now be discussed with reference to the flow chart of FIG. 8 and the modules of FIG. 9. For example, modules of FIG. 9 may be stored in server memory 709 of FIG. 7, and these modules may provide instructions so that when the instructions of a module are executed by server processor 701, processor 701 performs respective operations of the flow chart of FIG. 8.

As shown in FIGS. 5 and 7, server 700 of the back-end system may communicate over network 501 with primary user device 101 and/or secondary user device 102 using network interface 705. Server processor 701 may thus transmit and/or receive communications through network interface 705.

Methods of authorizing secondary user device 102 for a network service provided over a network 501 are thus discussed with respect to FIGS. 8 and 9. For example, the network service may be provided for a user 103 of both of the primary and secondary user devices 101 and 102.

At block 802, processor 701 may receive a request from primary user device 101 (e.g., using voucher request reception module 902) through network interface 705. Responsive to receiving the request from primary user device 101, processor 701 may transmit a voucher through network interface 705 over the network 501 to primary user device 101 at block 803 (e.g., using voucher transmission module 903). The voucher may be related to authorization of the secondary user device.

At block 805, processor 701 may receive a request for an authorization waiver from secondary user device 102 through network interface 705 over network 501 wherein the request for the authorization waiver includes the voucher that was transmitted to the primary user device 101 (e.g., using authorization waiver request reception module 905). Responsive to receiving the request from the secondary user device including the voucher, processor 701 may transmit an authorization waiver to the secondary user device 102 at block 806 (e.g., using authorization waiver transmission module 906). The authorization waiver may include a session cookie.

Responsive to receiving the request for an authorization waiver including the voucher, processor 701 may invalidate the voucher at block 806.1 (e.g., using voucher invalidation module 906.1). Invalidating the voucher may include invalidating the voucher with respect to the user so that the voucher is not reused for the network service with respect to the user 103.

Transmitting the voucher at block 803 may include transmitting the voucher from back-end server 105 to primary user device 101, receiving the request from secondary user device 102 at block 805 may include receiving the request from secondary user device 102 at the back-end server 105, and transmitting the authorization waiver at block 806 may include transmitting the authorization waiver from back-end server 105 to secondary user device 102.

At block 807, processor 701 may receive a request for an access token from secondary user device 102 over network 501 at an authorization server wherein the request for an access token includes the session cookie (e.g., using access token request reception module 907).

Responsive to receiving the request for an access token, processor 701 may redirect the secondary user device to authorization portal 109 at block 808 (e.g., using authorization portal redirection module 908). At block 809, processor may receive the authorization waiver including the session cookie at authorization portal 109 from secondary user device 102 (e.g., using authorization waiver reception module 909). At block 809.1, processor may provide authorization for secondary user device 102 based on the session cookie (e.g., using authorization provision module 909.1), wherein transmitting the access token comprises transmitting the access token responsive to providing the authorization based on the session cookie. Responsive to receiving the request for an access token, processor 701 may transmit an access token through network interface 705 to the secondary user device 102 at block 810 (e.g., using access token transmission module 910) wherein the access token is valid for back-end server 105. More particularly, processor 701 may transmit the access token from authorization server 107 over network 501 to secondary user device 102. Moreover, back-end server 105, authorization server 107, and/or authorization portal 109 may be elements of a back-end system supporting operation of the network service.

Processor 701 may receive a request through network interface 705 from secondary user device 102 at block 811 (e.g., using request reception module 911) wherein the request includes the access token. Responsive to receiving the request including the access token, processor 701 may provide communication for secondary user device 102 through network interface 705 and network 501 in accordance with the network service at block 812 (e.g., using communication module 912). The network service, for example, may be at least one of a voice, video, and/or messaging service. Moreover, receiving the request including the access token may include receiving the request including the access token at back-end server 105 over network 501 from secondary user device 102.

Various operations of FIG. 8 and/or modules of FIG. 9 may be optional with respect to some embodiments of back-end systems/servers and related methods. Regarding methods of example embodiment 1 (set forth below), for example, operations of blocks 802, 806.1, 807, 808, 809, 809.1, 810, 811, and 812 of FIG. 8 may be optional, and regarding related back-end systems/servers, modules 902, 806.1, 907, 908, 909, 909.1, 910, 911, and 912 of FIG. 9 may be optional.

Operations of a secondary user device 102 will now be discussed with reference to the flow chart of FIG. 10 and the modules of FIG. 11. For example, modules of FIG. 10 may be stored in user device memory 609 of FIG. 6, and these modules may provide instructions so that when the instructions of a module are executed by user device processor 601, processor 601 performs respective operations of the flow chart of FIG. 10.

As shown in FIGS. 5 and 6, secondary user device 102 may communicate over network 501 with elements of a back-end system/server communication interface 605. Processor 601 may thus transmit and/or receive communications through communication interface 605.

Methods of operating secondary user device 102 to provide authorization for a network service are discussed with respect to FIGS. 10 and 11. At block 1004, processor 601 may receive a voucher through communication interface 605 and/or image capture device 607 from a primary user device 101 (e.g., using voucher reception module 1104). At block 1005, processor 601 may transmit a request for an authorization waiver through network interface 605 over network 501 to a back-end system for the network service (e.g., using authorization waiver request transmission module 1105), wherein the request for the authorization waiver includes the voucher. After transmitting the request for the authorization waiver, processor 601 may receive an authorization waiver through communication interface 605 from the back-end system at block 1006 (e.g., using authorization waiver reception module 1106), and the authorization waiver may include a session cookie.

Processor 601 may transmit a request for an access token to the back-end system at block 1007 (e.g., using access token request transmission module 1107), wherein the request for an access token includes the session cookie. After transmitting the request for an access token, processor 601 may receive an access token through communication interface 605 from the back-end system at block 1010 (e.g., using access token reception module 1110). At block 1011, processor 601 may transmit a request through communication interface 605 to the back-end system (e.g., using communication request transmission module 1111), wherein the request includes the access token. At block 1012, processor may establish a session using the access token to provide communication through communication interface 605 and network 501 in accordance with the network service (e.g., using session establishment module 1112).

Various operations of FIG. 10 and/or modules of FIG. 11 may be optional with respect to some embodiments of secondary user devices and related methods. Regarding methods of example embodiment 19 (set forth below), for example, operations of blocks 1007, 1010, 1011, and 1012 of FIG. 10 may be optional, and regarding related secondary user devices, modules 1107, 1110, 1111, and 1112 of FIG. 11 may be optional.

Operations of a primary user device 101 will now be discussed with reference to the flow chart of FIG. 12 and the modules of FIG. 13. For example, modules of FIG. 12 may be stored in user device memory 609 of FIG. 6, and these modules may provide instructions so that when the instructions of a module are executed by user device processor 601, processor 601 performs respective operations of the flow chart of FIG. 12.

As shown in FIGS. 5 and 6, primary user device 101 may communicate over network 501 with elements of a back-end system/server using communication interface 605. Processor 601 may thus transmit and/or receive communications through communication interface 605.

Methods of operating a primary user device 101 to provide authorization for a network service on a secondary user device 102 are discussed below with respect to FIGS. 12 and 13. At block 1222, processor 601 may transmit a request for a voucher through communication interface 605 over network 501 to a back-end system (e.g., using voucher request transmission module 1322). Moreover, transmitting the request for a voucher may include transmitting the request responsive to user input to assist authorization of the secondary user device. At block 1223, processor 601 may receive a voucher over network 501 from the back-end system through communication interface 605 after transmitting the request for a voucher (e.g., using voucher reception module 1323), wherein the voucher is related to authorization of the of the secondary user device.

At block 1223.1, processor 601 may provide a prompt (e.g., on display 603d) for user input to initiate transferring the voucher to the secondary user device responsive to receiving the voucher (e.g., using prompt provision module 1323.1). At block 1223.2, processor 601 may accept user input to initiate transferring the voucher to the secondary user device based on the prompt (e.g., using input acceptance module 1323.2), and transferring the voucher may include transferring the voucher responsive to accepting the user input to initiate transferring the voucher.

At block 1224, processor 601 may transfer the voucher through display 603d and/or communication interface 604 to secondary user device 102 (e.g., using voucher transfer module 1324). Transferring the voucher may include transferring the voucher directly to the secondary user device 102. For example, transferring the voucher directly may include transferring the voucher directly to the secondary user device 102 without user input of the voucher through a user interface at the secondary user device. Transferring the voucher may include transferring the voucher to the secondary user device 102 via a short range communication interface such as a Near Field Communications (NFC) interface, a Bluetooth interface, and/or an infrared interface. Transferring the voucher may include providing an image including the voucher on display 603d of the primary communication device 101, for example, with the voucher encoded in the image.

Various operations of FIG. 12 and/or modules of FIG. 13 may be optional with respect to some embodiments of primary user devices and related methods. Regarding methods of example embodiment 37 (set forth below), for example, operations of blocks 1223.1 and 1223.2 of FIG. 12 may be optional, and regarding related primary user devices, modules 1323.1 and 1323.2 of FIG. 13 may be optional.

Additional operations of a primary user device 101 will now be discussed with reference to the flow chart of FIG. 14 and the modules of FIG. 15. For example, modules of FIG. 15 may be stored in user device memory 609 of FIG. 6, and these modules may provide instructions so that when the instructions of a module are executed by user device processor 601, processor 601 performs respective operations of the flow chart of FIG. 14. Moreover, operations of blocks 1222, 1223, 1223.1, 1223.2, and 1224 of FIG. 14 and related modules 1322, 1323, 1323.1, 1323.2, and 1324 of FIG. 15 may be similar to blocks/modules of FIGS. 12 and 13.

As shown in FIGS. 5 and 6, primary user device 101 may communicate over network 501 with elements of a back-end system/server using communication interface 605. Processor 601 may thus transmit and/or receive communications through communication interface 605.

Methods of operating a primary user device 101 to provide authorization for a network service on a secondary user device 102 are discussed below with respect to FIGS. 12 and 13. At block 1205, processor 601 may provide a prompt for user input of credentials for the network service on display 603d (e.g., using prompt provision module 1305). At block 1206, processor may accept user input of credentials for the network service (e.g., including a username and a password associate with the user for the network service) through a user interface (e.g., user input device 603d) of primary user device 101 (e.g., using credential acceptance module 1306). At block 1207, processor 601 may transmit the user credentials for the network service through communication interface 605 over network 501 to the back-end system. At block 1209, processor 601 may receive an access token through communication interface 605 from the back-end system (e.g., using access token reception module 1309), wherein receiving the access token includes receiving the access token after transmitting the user credentials for the network service.

At block 1222, processor 601 may transmit a request for a voucher through communication interface 605 over network 501 to a back-end system (e.g., using voucher request transmission module), and the request may include the access token. After transmitting the request for a voucher, processor 601 may receive a voucher over the network 501 through communication interface 605 from the back-end system at block 1223 (e.g., using voucher reception module 1323). At block 1223.1, processor 601 may provide a prompt on display 603c for user input to initiate transferring the voucher to the secondary user device responsive to receiving the voucher (e.g., using prompt provision module 1323.1). At block 1223.2, processor 601 may accept user input through user input device 603c to initiate transferring the voucher to the secondary user device based on the prompt (e.g., using input acceptance module 1323.2), wherein transferring the voucher may include transferring the voucher responsive to accepting the user input to initiate transferring the voucher. At block 1224, processor 601 may transfer the voucher to secondary user device 102 through display 603d and/or communication interface 605 (e.g., using voucher transfer module 1324).

Various operations of FIG. 14 and/or modules of FIG. 15 may be optional with respect to some embodiments of primary user devices and related methods. Regarding methods of example embodiment 47 (set forth below), for example, operations of blocks 1205, 1206, 1207, 1223.1 and 1223.2 of FIG. 14 may be optional, and regarding related primary user devices, modules 1305, 1306, 1307, 1323.1 and 1323.2 of FIG. 15 may be optional.

Abbreviations

Abbreviation Explanation

IMS IP Multimedia Subsystem
IP Internet Protocol
ISDN Integrated Services Digital Network
MSISDN Mobile Subscriber ISDN Number
NFC Near Field Communication
QR Quick Response
SIM Subscriber Identity Module

REFERENCES

[1] RFC 6749—The OAuth 2.0 Authorization Framework, https://tools.ietf.org/html/rfc6749;
[2] US 20060185004 A1—Method and system for single sign-on in a network, https://www.google.com/patents/US20060185004; and
[3] US 20120210413 A1—Facilitating single sign-on (sso) across multiple browser instance, https://www.google.com/patents/US20120210413.

EXAMPLE EMBODIMENTS

Embodiment 1

A method of authorizing a secondary user device (102) for a network service provided over a network (501), the method comprising: responsive to receiving a request from a primary user device (101), transmitting (403) a voucher over the network (501) to the primary user device (101); receiving (405) a request for an authorization waiver from the secondary user device (102) over the network (501) wherein the request for the authorization waiver includes the voucher that was transmitted to the primary user device (101); and responsive to receiving the request from the secondary user device including the voucher, transmitting (406) an authorization waiver to the secondary user device (102).

Embodiment 2

The method of Embodiment 1, wherein the primary user device (101) and the secondary user device (102) are different.

Embodiment 3

The method of any of Embodiments 1-2, wherein the voucher is related to authorization of the secondary user device.

Embodiment 4

The method of any of Embodiments 1-3, wherein the authorization waiver includes a session cookie.

Embodiment 5

The method of any of Embodiments 1-4, wherein the network service is provided for a user (103) of both of the primary and secondary user devices (101 and 102), the method further comprising: responsive to receiving the request for an authorization waiver including the voucher, invalidating the voucher.

Embodiment 6

The method of Embodiment 5 wherein invalidating the voucher comprises invalidating the voucher with respect to the user so that the voucher is not reused for the network service with respect to the user (103).

Embodiment 7

The method of any of Embodiments 1-6 wherein transmitting the voucher comprises transmitting the voucher from a back-end server (105) to the primary user device (101), wherein receiving the request from the secondary user device (102) comprises receiving the request from the secondary user device (102) at the back-end server (105), and wherein transmitting the authorization waiver comprises transmitting the authorization waiver from the back-end server (105) to the secondary user device (102).

Embodiment 8

The method of Embodiment 7, wherein the authorization waiver includes a session cookie, the method further comprising: receiving (407) a request for an access token from the secondary user device (102) wherein the request for an access token includes the session cookie; and responsive to receiving the request for an access token, transmitting (410) an access token to the secondary user device (102) wherein the access token is valid for the back-end server (105).

Embodiment 9

The method of Embodiment 8, wherein receiving the request for an access token comprises receiving the request for an access token from the secondary user device over the network (501) at an authorization server (107), and wherein transmitting the access token comprises transmitting the access token from the authorization server (107) over the network (501) to the secondary user device (102).

Embodiment 10

The method of Embodiment 9 further comprising: responsive to receiving the request for an access token, redirecting (408) the secondary user device to an authorization portal (109); receiving (409) the authorization waiver including the session cookie at the authorization portal (109) from the secondary user device (102); and providing (409.1) authorization for the secondary user device (102) based on the session cookie, wherein transmitting the access token comprises transmitting the access token responsive to providing the authorization based on the session cookie.

Embodiment 11

The method of any of Embodiments 7-10, wherein the back-end server (105) server is an element of a back-end system supporting operation of the network service.

Embodiment 12

The method of any of Embodiments 9-10 wherein the back-end server (105) and the authorization server (107) are elements of a back-end system supporting operation of the network service.

Embodiment 13

The method of Embodiment 10 wherein the back-end server (105), the authorization server (107), and the authorization portal (109) comprise elements of a back-end system supporting operation of the network service.

Embodiment 14

The method of any of Embodiments 8-13 further comprising: receiving (411) a request from the secondary user device (102) wherein the request includes the access token; and responsive to receiving the request including the access token, providing communication for the secondary user device (102) through the network (501) in accordance with the network service.

Embodiment 15

The method of Embodiment 14 wherein the network service comprises at least one of a voice, video, and/or messaging service.

Embodiment 16

The method of any of Embodiments 14-15 wherein receiving the request including the access token comprises receiving the request including the access token at the back-end server (105) over the network (501) from the secondary user device (102).

Embodiment 17

A back-end system (105, 107, and/or 109), wherein the back-end system is adapted to perform according to any of embodiments 1-16.

Embodiment 18

A back-end system comprising: a network interface (705) configured to provide communication over a network (501); and a processor (705) coupled with the network interface, where the processor is configured to perform operations according to any of Embodiments 1-16, and wherein the processor is configured to transmit and/or receive communications to/from the primary and/or secondary user devices through the network interface over the network.

Embodiment 19

A method of operating a secondary user device (102) to provide authorization for a network service, the method comprising: receiving (404) a voucher from a primary user device (101); transmitting (405) a request for an authorization waiver over the network (501) to a back-end system for the network service, wherein the request for the authorization waiver includes the voucher; after transmitting the request for the authorization waiver, receiving (406) an authorization waiver from the back-end system.

Embodiment 20

The method of Embodiment 19, wherein the authorization waiver includes a session cookie.

Embodiment 21

The method of Embodiment 20, the method further comprising: transmitting (407) a request for an access token to the back-end system, wherein the request for an access token includes the session cookie.

Embodiment 22

The method of any of Embodiments 19-20, the method further comprising: receiving (410) an access token from the back-end system; transmitting (411) a request to the back-end system, wherein the request includes the access token; and establishing a session using the access token to provide communication through the network (501) in accordance with the network service.

Embodiment 23

The method of Embodiment 22, the method further comprising: transmitting (407) a request for an access token to the back-end system, wherein the request for an access token includes a session cookie, and wherein receiving the access token comprises receiving the access token after transmitting the request for an access token.

Embodiment 24

The method of any of Embodiments 19-23 wherein the back-end system includes a back-end server (105), wherein transmitting the request for an authorization waver comprises transmitting the request to the back-end server, and wherein receiving the authorization waver comprises receiving the authorization waiver from the back-end server.

Embodiment 25

The method of any of Embodiments 22-24 wherein receiving the access token comprises receiving the access token from the back-end server, and wherein the access token is valid for the back-end server.

Embodiment 26

The method of any of Embodiments 19-25 wherein receiving the voucher comprises receiving the voucher directly from the primary user device (101).

Embodiment 27

The method of Embodiment 26 wherein receiving the voucher directly from the primary user device comprises receiving the voucher directly from the primary user device without user input of the voucher through a user interface of the secondary user device.

Embodiment 28

The method of any of Embodiments 19-27 wherein receiving the voucher comprises receiving the voucher from the primary user device (101) via a short range communication interface.

Embodiment 29

The method of Embodiment 28 wherein the short range communication interface comprises one of a Near Field Communications, NFC, interface, a Bluetooth interface, or an infrared interface.

Embodiment 30

The method of any of Embodiments 19-27 wherein receiving the voucher comprises receiving the voucher optically from a display of the primary user device using an image capture device on the secondary user device.

Embodiment 31

The method of any of Embodiments 19-30 wherein transmitting the request for an authorization waiver comprises transmitting the request automatically without user intervention responsive to receiving the voucher from the primary user device.

Embodiment 32

The method of any of Embodiments 21-31, wherein transmitting the request for an access token comprises transmitting the request for the access token automatically without user intervention responsive to receiving the authorization waiver.

Embodiment 33

The method of any of Embodiments 22-32 wherein transmitting the request including the access token comprises transmitting the request automatically responsive to receiving the access token.

Embodiment 34

The method of any of Embodiments 19-33 wherein the network service comprises at least one of a voice, video, and/or messaging service.

Embodiment 35

A secondary user device, wherein the secondary user device is adapted to perform according to any of Embodiments 19-34.

Embodiment 36

A secondary user device comprising: a communication interface configured to provide communication over a network; and a processor coupled with the communication interface, wherein the processor is configured to perform actions according to any of Embodiments 19-34, and wherein the processor is configured to transmit and/or receive communications over the network through the communication interface.

Embodiment 37

A method of operating a primary user device (101) to provide authorization for a network service on a secondary on a secondary user device (102), the method comprising: transmitting (402) a request for a voucher over a network (501) to a back-end system; after transmitting the request for a voucher, receiving (403) a voucher over the network (501) from the back-end system; and transferring (404) the voucher to the secondary user device (102).

Embodiment 38

The method of Embodiment 37, wherein transmitting the request for a voucher comprises transmitting the request responsive to user input to assist authorization of the secondary user device (102).

Embodiment 39

The method of any of Embodiments 37-38, further comprising: responsive to receiving the voucher, providing (403.1) a prompt for user input to initiate transferring the voucher to the secondary user device; and accepting (403.2) user input to initiate transferring the voucher to the secondary user device based on the prompt, wherein transferring the voucher comprises transferring the voucher responsive to accepting the user input to initiate transferring the voucher.

Embodiment 40

The method of any of Embodiments 37-39 wherein transferring the voucher comprises transferring the voucher directly to the secondary user device (102).

Embodiment 41

The method of Embodiment 40 wherein transferring the voucher directly comprises transferring the voucher directly to the secondary user device (102) without user input of the voucher through a user interface at the secondary user device.

Embodiment 42

The method of any of Embodiments 37-41 wherein transferring the voucher comprises transferring the voucher to the secondary user device (102) via a short range communication interface.

Embodiment 43

The method of Embodiment 42 wherein the short range communication interface comprises one of a Near Field Communications, NFC, interface, a Bluetooth interface, or an infrared interface.

Embodiment 44

The method of any of Embodiments 37-41 wherein transferring the voucher comprises providing an image including the voucher on a display of the primary communication device (101).

Embodiment 45

The method of Embodiment 44 wherein the voucher is encoded in the image.

Embodiment 46

The method of any of Embodiments 37-45, wherein the voucher is related to authorization of the of the secondary user device.

Embodiment 47

The method of any of Embodiments 37-46, the method further comprising: receiving (309) an access token from the back-end system; wherein request for a voucher includes the access token.

Embodiment 48

The method of Embodiment 47 further comprising: providing a prompt for user input of credentials for the network service; accepting user input of credentials for the network service through a user interface of the primary user device (101); and transmitting the user credentials for the network service over the network (501) to the back-end system; wherein receiving the access token comprises receiving the access token after transmitting the user credentials for the network service.

Embodiment 49

The method of Embodiment 49 wherein the user credentials for the network service comprise a username and a password associated with the user for the network service.

Embodiment 50

A primary user device, wherein the primary user device is adapted to perform according to any of Embodiments 37-49.

Embodiment 51

A primary user device comprising: a communication interface configured to provide communication over a network; and a processor coupled with the communication interface, wherein the processor is configured to perform actions according to any of Embodiments 37-49, and wherein the processor is configured to transmit and/or receive communications over the network through the communication interface.

Embodiment 52

A secondary user device (102) comprising: a communication interface (605-2) configured to provide communication over a network (501); and a processor (601-2) coupled with the communication interface (605-2), wherein the processor (601-2) is configured to, receive a voucher from a primary user device (101) through the communication interface (605-2), transmit a request for an authorization waiver through the communication interface (605-2) over the network (501) to a back-end system for the network service, wherein the request for the authorization waiver includes the voucher, and receive an authorization waiver through the communication interface (605-2) from the back-end system after transmitting the request for the authorization waiver.

Embodiment 53

The secondary user device of Embodiment 52, wherein the authorization waiver includes a session cookie.

Embodiment 54

The secondary user device of Embodiment 53, wherein the processor is further configured to, transmit a request for an access token through the communication interface (605-2) to the back-end system, wherein the request for an access token includes the session cookie.

Embodiment 55

The secondary user device of any of Embodiments 52-53, wherein the processor is further configured to, receive an access token through the communication interface from the back-end system, transmit a request through the communication interface to the back-end system, wherein the request includes the access token, and establish a session through the communication interface using the access token to provide communication through the network (501) in accordance with the network service.

Embodiment 56

The secondary user device of Embodiment 55, wherein the processor is further configured to, transmit a request for an access token to the back-end system, wherein the request for an access token includes a session cookie, and wherein receiving the access token comprises receiving the access token after transmitting the request for an access token.

Embodiment 57

The secondary user device of any of Embodiments 52-56 wherein the back-end system includes a back-end server (105), wherein transmitting the request for an authorization waver comprises transmitting the request to the back-end server, and wherein receiving the authorization waver comprises receiving the authorization waiver from the back-end server.

Embodiment 58

The secondary user device of any of Embodiments 55-57 wherein receiving the access token comprises receiving the access token from the back-end server, and wherein the access token is valid for the back-end server.

Embodiment 59

The secondary user device of any of Embodiments 52-58 wherein receiving the voucher comprises receiving the voucher directly from the primary user device (101).

Embodiment 60

The secondary user device of Embodiment 59 wherein receiving the voucher directly from the primary user device comprises receiving the voucher directly from the primary user device without user input of the voucher through a user interface of the secondary user device.

Embodiment 61

The secondary user device of any of Embodiments 52-60 wherein receiving the voucher comprises receiving the voucher from the primary user device (101) via a short range communication interface (605*b*) of the communication interface (605).

Embodiment 62

The secondary user device of Embodiment 61 wherein the short range communication interface (605*b*) comprises one of a Near Field Communications, NFC, interface, a Bluetooth interface, or an infrared interface.

Embodiment 63

The secondary user device of any of Embodiments 52-60 wherein receiving the voucher comprises receiving the voucher optically from a display of the primary user device using an image capture device (607) on the secondary user device.

Embodiment 64

The secondary user device of any of Embodiments 52-63 wherein transmitting the request for an authorization waiver comprises transmitting the request automatically without user intervention responsive to receiving the voucher from the primary user device.

Embodiment 65

The secondary user device of any of Embodiments 54-64, wherein transmitting the request for an access token comprises transmitting the request for the access token automatically without user intervention responsive to receiving the authorization waiver.

Embodiment 66

The secondary user device of any of Embodiments 55-65 wherein transmitting the request including the access token comprises transmitting the request automatically responsive to receiving the access token.

Embodiment 67

The secondary user device of any of Embodiments 52-66 wherein the network service comprises at least one of a voice, video, and/or messaging service.

Embodiment 68

A primary user device (101) comprising: a communication interface (605-1) configured to provide communication over a network; and a processor (601-1) coupled with the communication interface (605-1), wherein the processor is configured to, transmit a request for a voucher through the communication interface (605-1) over a network (501) to a back-end system, receive a voucher through the communication interface over the network (501) from the back-end system after transmitting the request for a voucher, and transfer (404) the voucher to the secondary user device (102).

Embodiment 69

The primary user device of Embodiment 68, wherein transmitting the request for a voucher comprises transmitting the request responsive to user input to assist authorization of the secondary user device (102) for the network service.

Embodiment 70

The primary user device of any of Embodiments 68-69, wherein the processor is further configured to, provide a prompt for user input to initiate transferring the voucher to the secondary user device responsive to receiving the voucher, and accept user input to initiate transferring the voucher to the secondary user device based on the prompt, wherein transferring the voucher comprises transferring the voucher responsive to accepting the user input to initiate transferring the voucher.

Embodiment 71

The primary user device of any of Embodiments 68-70 wherein transferring the voucher comprises transferring the voucher directly to the secondary user device (102).

Embodiment 72

The primary user device of Embodiment 71 wherein transferring the voucher directly comprises transferring the voucher directly to the secondary user device (102) without user input of the voucher through a user interface at the secondary user device.

Embodiment 73

The primary user device of any of Embodiments 68-72 wherein transferring the voucher comprises transferring the voucher to the secondary user device (102) via a short range communication interface (605*b*-1).

Embodiment 74

The primary user device of Embodiment 73 wherein the short range communication interface (605*b*-1) comprises one of a Near Field Communications, NFC, interface, a Bluetooth interface, or an infrared interface.

Embodiment 75

The primary user device of any of Embodiments 68-72 wherein transferring the voucher comprises providing an image including the voucher on a display (603*d*-1) of the primary communication device (101).

Embodiment 76

The primary user device of Embodiment 75 wherein the voucher is encoded in the image.

Embodiment 77

The primary user device of any of Embodiments 68-76, wherein the voucher is related to authorization of the of the secondary user device.

Embodiment 78

The primary user device of any of Embodiments 68-77, wherein the processor is further configured to, receive an access token from the back-end system, wherein request for a voucher includes the access token.

Embodiment 79

The primary user device of Embodiment 78, wherein the processor is further configured to, provide a prompt for user input of credentials for the network service, accept user input of credentials for the network service through a user interface of the primary user device (101), and transmit the user credentials for the network service through the communication interface (605-1) over the network (501) to the back-end system, wherein receiving the access token comprises receiving the access token after transmitting the user credentials for the network service.

Embodiment 80

The primary user device of Embodiment 79 wherein the user credentials for the network service comprise a username and a password associated with the user for the network service.

Embodiment 81

A back-end system for a network service provided over a network (501), the back-end system comprising: a network interface (705) configured to provide communication over the network (501); and a processor (701) coupled with the network interface, wherein the processor is configured to, transmit a voucher through the network interface over the network (501) to the primary user device (101) responsive to receiving a request from a primary user device (101), receive a request for an authorization waiver through the network interface from the secondary user device (102) over the network (501) wherein the request for the authorization waiver includes the voucher that was transmitted to the primary user device (101), and transmit an authorization waiver to the secondary user device (102) responsive to receiving the request from the secondary user device including the voucher.

Embodiment 82

The back-end system of Embodiment 81, wherein the primary user device (101) and the secondary user device (102) are different.

Embodiment 83

The back-end system of any of Embodiments 81-82, wherein the voucher is related to authorization of the secondary user device for the network service.

Embodiment 84

The back-end system of any of Embodiments 81-83, wherein the authorization waiver includes a session cookie.

Embodiment 85

The back-end system of any of Embodiments 81-84, wherein the network service is provided for a user (103) of both of the primary and secondary user devices (101 and 102), wherein the processor is further configured to, invalidate the voucher responsive to receiving the request for an authorization waiver including the voucher.

Embodiment 86

The back-end system of Embodiment 85 wherein invalidating the voucher comprises invalidating the voucher with respect to the user so that the voucher is not reused for the network service with respect to the user (103).

Embodiment 87

The back-end system of any of Embodiments 81-86 wherein the processor comprises a back-end server processor (701-5) and the network interface comprises a back-end server network interface (705-5), wherein transmitting the voucher comprises the back-end server processor (701-5) transmitting the voucher through the back-end server network interface (705-5) over the network to the primary user device (101), wherein receiving the request from the secondary user device (102) comprises the back-end server processor (701-5) receiving the request from the secondary user device (102) through the back-end server network interface (705-5), and wherein transmitting the authorization waiver comprises the back-end server processor (701-5) transmitting the authorization waiver through the back-end server network interface (705-5) to the secondary user device (102).

Embodiment 88

The back-end system of Embodiment 87, wherein the authorization waiver includes a session cookie, wherein the processor (701) is further configured to, receive a request for an access token through the network interface (705) from the secondary user device (102) wherein the request for an access token includes the session cookie, and transmit an access token through the network interface (701) to the secondary user device (102) responsive to receiving the request for an access token wherein the access token is valid for the back-end server (105).

Embodiment 89

The back-end system of Embodiment 88, wherein the processor (701) comprises an authorization server processor (701-7) and the network interface (705) comprises an authorization server network interface (705-7), wherein receiving the request for an access token comprises the authorization server processor (701-7) receiving the request for an access token through the authorization server network interface (705-7) from the secondary user device over the network (501), and wherein transmitting the access token comprises the authorization server processor (701-5) transmitting the access token through the authorization server network interface (705-7) over the network (501) to the secondary user device (102).

Embodiment 90

The back-end system of Embodiment 89 wherein the processor (701) is further configured to, redirect the secondary user device to an authorization portal (109) responsive to receiving the request for an access token, receive the authorization waiver including the session cookie at the authorization portal (109) from the secondary user device (102), and provide authorization for the secondary user device (102) based on the session cookie, wherein transmitting the access token comprises transmitting the access token responsive to providing the authorization based on the session cookie.

Embodiment 91

The back-end system of any of Embodiments 88-90 wherein the processor (701) is further configured to, receive a request through the network interface (705) from the secondary user device (102) wherein the request includes the access token, and provide communication for the secondary user device (102) through the network interface (701) in accordance with the network service responsive to receiving the request including the access token.

Embodiment 92

The back-end system of Embodiment 91 wherein the network service comprises at least one of a voice, video, and/or messaging service.

Embodiment 93

The back-end system of any of Embodiments 91-92 wherein receiving the request including the access token comprises the back-end server processor (701-5) receiving the request including the access token through the back-end server network interface (701-5) from the secondary user device (102).

Further Definitions

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a primary user device to provide authorization for a network service on a secondary user device, the method comprising:
providing a prompt for user input of credentials for the network service;
receiving an access token from a back-end system;
transmitting a request for a voucher over a network to the back-end system;
after transmitting the request for a voucher, receiving a single-use voucher over the network from the back-end system, wherein the single-use voucher is encoded in an animated image; and
transferring the single-use voucher to the secondary user device only while the primary user device and the secondary user device are in close proximity to each other and are under control of a same user so as to prevent interception of the transferring by an unintended device not under control of the same user.

2. The method of claim 1, further comprising accepting user input of credentials for the network service through a user interface of the primary user device.

3. The method of claim 2, further comprising transmitting the user credentials for the network service over the network to the back-end system.

4. The method of claim 1, wherein providing the prompt for user input credentials comprises providing the prompt for user input credentials through a user interface of the primary user device.

5. The method of claim 1, wherein, receiving the access token is performed after transmitting the user credentials for the network service.

6. The method of claim 1, wherein the user credentials comprise a user name and a password that are associated with a user.

7. The method of claim 1, wherein the back-end system comprises an authentication and/or authorization function that is configured to collect and process user credentials to verify an identity of a user that is in control of the primary user device.

8. The method of claim 7, wherein authorization of the primary user device to interact with the back-end system is based on the authentication and/or authorization function to be performed at the primary user device.

9. The method of claim 7, wherein the primary user device submits the user credentials to an authorization/authentication portal to authorize/authenticate the user.

10. The method of claim 9, wherein, responsive to successfully authorizing/authenticating the user login credentials, the method further comprises agreeing on the access token to be used by the primary user device.

11. The method of claim 1, wherein the request for a voucher includes the access token.

12. The method of claim 1, wherein transmitting the request for a voucher comprises transmitting the request responsive to user input to assist authorization of the secondary user device.

13. A primary user device comprising:
a communication interface configured to provide communication over a network; and
a processor coupled with the communication interface, wherein the processor is configured to:
provide a prompt for user input of credentials for a network service;
receive an access token from a back-end system;
transmit a request for a voucher through the communication interface over the network to the back-end system;
receive a single-use voucher through the communication interface over the network from the back-end system after transmitting the request for a voucher, wherein the single-use voucher is encoded in an animated image; and
transfer the single-use voucher to the secondary user device only while the primary user device and the secondary user device are in close proximity to each other and are under control of a same user so as to prevent interception of the transferring by an unintended device not under control of the same user.

14. The primary user device of claim 13, wherein the processor is further configured to receive the user input credentials for the network service via the user interface of the primary user device.

15. The primary user device of claim 14, wherein, responsive to receiving the user input credentials for the network service via the user interface of the primary user device, the processor is further configured to transmit the user credentials over the network to the back-end system.

16. The primary user device of claim 13, wherein, receiving the access token is performed after transmitting the user credentials for the network service.

17. The primary user device of claim 13, wherein the user credentials comprise a user name and a password that are associated with a user.

18. The primary user device of claim 13, wherein the back-end system comprises an authentication and/or authorization function that is configured to collect and process user credentials to verify an identity of a user that is in control of the primary user device.

19. The primary user device of claim 18, wherein authorization of the primary user device to interact with the back-end system is based on the authentication and/or authorization function to be performed at the primary user device.

20. The primary user device of claim 13, wherein providing a prompt for user input of credentials comprises presenting a login page on a user interface of the primary user device.

21. The primary user device of claim 20, wherein the processor is further configured to receive a user entry of login credentials via the user interface.

22. The primary user device of claim 21, wherein the primary user device submits the user credentials to an authorization/authentication portal to authorize/authenticate the user.

23. The primary user device of claim 22, wherein, responsive to successfully authorizing/authenticating the user login credentials, the processor is further configured to agree on the access token to be used by the primary user device.

24. The primary user device of claim 13, wherein the request for a voucher includes the access token.

25. The primary user device of claim 13, wherein the processor configured to transmit the request for a voucher is further configured to transmit the request responsive to user input to assist authorization of the secondary user device.

26. The primary user device of claim 13, wherein transmitting the request for a voucher comprises transmitting the request responsive to user input to assist authorization of the secondary user device for the network service.

27. The primary user device of claim 13, wherein the processor is further configured to:
provide a prompt for user input to initiate transferring the single-use voucher to the secondary user device responsive to receiving the single-use voucher, and
accept user input to initiate transferring the single-use voucher to the secondary user device based on the prompt, wherein transferring the single-use voucher comprises transferring the single-use voucher responsive to accepting the user input to initiate transferring the single-use voucher.

28. The primary user device of claim 13, wherein transferring the single-use voucher comprises transferring the single-use voucher directly to the secondary user device.

29. The primary user device of claim 28 wherein transferring the single-use voucher directly comprises transferring the single-use voucher directly to the secondary user device without user input of the single-use voucher through a user interface at the secondary user device.

30. The primary user device of claim 13, wherein transferring the single-use voucher comprises transferring the single-use voucher to the secondary user device via a short range communication interface.

31. The primary user device of claim 30, wherein the short range communication interface comprises one of a Near Field Communications, NFC, interface, a Bluetooth interface, or an infrared interface.

32. The primary user device of claim 13, wherein the single-use voucher is related to authorization of the of the secondary user device.

33. The primary user device of claim 13, wherein the request for a voucher includes the access token.

\* \* \* \* \*